(12) United States Patent
Kazama et al.

(10) Patent No.: US 11,014,745 B2
(45) Date of Patent: May 25, 2021

(54) PICKING SYSTEM AND PICKING METHOD

(71) Applicant: Hitachi Transport System, Ltd., Tokyo (JP)

(72) Inventors: Yoriko Kazama, Tokyo (JP); Junichi Kimura, Tokyo (JP); Emi Takahashi, Tokyo (JP)

(73) Assignee: Hitachi Transport System, Ltd., Tokyo (JP)

( * ) Notice: Subject to any disclaimer, the term of this patent is extended or adjusted under 35 U.S.C. 154(b) by 389 days.

(21) Appl. No.: 16/089,429

(22) PCT Filed: Apr. 5, 2016

(86) PCT No.: PCT/JP2016/061101
§ 371 (c)(1),
(2) Date: Sep. 28, 2018

(87) PCT Pub. No.: WO2017/175301
PCT Pub. Date: Oct. 12, 2017

(65) Prior Publication Data
US 2020/0299062 A1    Sep. 24, 2020

(51) Int. Cl.
*B65G 1/137* (2006.01)
*G06Q 10/08* (2012.01)

(52) U.S. Cl.
CPC ......... *B65G 1/1378* (2013.01); *G06Q 10/087* (2013.01)

(58) Field of Classification Search
CPC combination set(s) only.
See application file for complete search history.

(56) References Cited

U.S. PATENT DOCUMENTS 9,008,827 B1 * 4/2015 Dwarakanath ........ A47F 3/0482
                                                              700/216
9,242,799 B1 * 1/2016 O'Brien ................. G06Q 10/08
(Continued)

FOREIGN PATENT DOCUMENTS

JP           9-208019 A    8/1997
JP       2004-231370 A    8/2004
(Continued)

OTHER PUBLICATIONS

International Search Report (PCT/ISA/210) issued in PCT Application No. PCT/JP2016/061101 dated Jun. 7, 2016 with English translation (five pages).
(Continued)

*Primary Examiner* — Kyle O Logan
(74) *Attorney, Agent, or Firm* — Crowell & Moring LLP

(57) ABSTRACT

The picking system according to the present invention for executing operation assistance corresponding to an operation target relating to physical distribution receives an order designating a specific article, retrieves a first storage position at which the specific article is stored from shelf stock information, generates operation instruction data relating to a specific operation target for instructing to move the specific article from the first storage position to a second storage position, refers to operation station information and accesses the first storage position, retrieves a specific operation station capable of performing the specific operation target, transmits the operation instruction data to a terminal of the specific operation station, and transmits, to a movement device, conveyance instruction data instructing to convey a conveyance rack to the specific operation station.

15 Claims, 20 Drawing Sheets

(56) References Cited

U.S. PATENT DOCUMENTS

| | | | | |
|---|---|---|---|---|
| 9,378,482 B1* | 6/2016 | Pikler | ................... | G06Q 10/087 |
| 10,214,354 B2* | 2/2019 | Toebes | ................... | G06Q 10/087 |
| 2004/0010337 A1* | 1/2004 | Mountz | ................ | G05D 1/0297 |
| | | | | 700/214 |
| 2007/0021864 A1* | 1/2007 | Mountz | ................ | G06Q 10/087 |
| | | | | 700/216 |
| 2008/0051985 A1* | 2/2008 | D'Andrea | ............ | G05D 1/0212 |
| | | | | 701/410 |
| 2013/0054005 A1* | 2/2013 | Stevens | ................ | G06Q 10/087 |
| | | | | 700/216 |
| 2013/0173049 A1* | 7/2013 | Brunner | ................ | G06Q 10/08 |
| | | | | 700/216 |
| 2013/0246229 A1* | 9/2013 | Mountz | ................. | G08C 17/02 |
| | | | | 705/28 |
| 2014/0214195 A1* | 7/2014 | Worsley | ............... | B65G 1/1378 |
| | | | | 700/217 |
| 2016/0229631 A1 | 8/2016 | Kimura et al. | | |
| 2018/0365631 A1* | 12/2018 | Moulin | ............ | G05B 19/41895 |

FOREIGN PATENT DOCUMENTS

| | | |
|---|---|---|
| JP | 2010-18375 A | 1/2010 |
| JP | 2013-256371 A | 12/2013 |
| WO | WO 2015/097736 A1 | 7/2015 |

OTHER PUBLICATIONS

Japanese-language Written Opinion (PCT/ISA/237) issued in PCT Application No. PCT/JP2016/061101 dated Jun. 7, 2016 (three pages).

\* cited by examiner

|  | 601 | 602 | 603 | 604 | 605 |
|---|---|---|---|---|---|
|  | ORDER ID | ARTICLE | NUMBER | FORM | CUSTOMER |
| 61 | ID001 | A | 2 | INDIVIDUAL | C1 |
| 62 | ID002 | B | 1 | INDIVIDUAL | C2 |
|  | ID003 | G | 10 | INDIVIDUAL | C4 |
|  | ID004 | J | 5 | INDIVIDUAL | C1 |
|  | ... | ... | ... | ... | ... |

600 ORDER MANAGEMENT TABLE

FIG. 6

|  | 701 | 702 | 703 | 704 | 705 |
|---|---|---|---|---|---|
|  | # | ARTICLE | SIZE | WEIGHT | PACKAGE UNIT (INDIVIDUAL/CASE) |
| 71 | 001 | A | 10 | 10 | 50 |
| 72 | 002 | B | 2 | 1 | 100 |
|  | 003 | C | 10 | 20 | 10 |
|  | 004 | D | 5 | 5 | 30 |
|  | ... | ... | ... | ... | ... |

700 ARTICLE INFORMATION MANAGEMENT TABLE

| # | ARTICLE | NUMBER | FORM | RACK ID | BAY | WORK SECTION |
|---|---------|--------|------|---------|-----|--------------|
| 001 | A | 20 | INDIVIDUAL | S01 | 3-2 | PICKING |
| 002 | A | 3 | CASE | S01 | UPPER | RESUPPLY |
| 003 | B | 5 | CASE | S02 | UPPER | PICKING |
| 004 | G | 100 | INDIVIDUAL | S04 | 1-4 | PICKING |
| 005 | J | 50 | INDIVIDUAL | S05 | 2-1 | PICKING |
| ... | ... | ... | ... | ... | ... | ... |

800 RACK INVENTORY INFORMATION MANAGEMENT TABLE

PICKING SYSTEM AND PICKING METHOD

BACKGROUND

The present invention pertains to a picking system and a picking method for picking articles.

Picking operations in which a worker picks articles from a rack according to orders are performed in warehouses and factories. In order to pick articles from racks on which many articles are placed, in many cases a worker moves within the warehouse and picks prescribed articles while referring to a list. In order to reduce the amount of time that the worker moves in search of the articles in order to improve work efficiency, there is a system in which a conveyance vehicle moves the racks on which the articles are placed to the worker.

Also, during a picking operation, the articles are stored at a height accessible by the worker. Thus, the upper space of the rack where articles would be stored is often not used. An example of efficient use of the upper space is disclosed in JP 2010-18375 A, for example. JP 2010-18375 A discloses providing a picking rack portion where articles to be picked are stored, and a resupply rack portion for storing articles for resupply above the picking rack portion, with a means being provided to convey articles in the resupply rack portion to the picking rack portion. As a result, the upper space of the racks can be used.

However, with the technique disclosed in JP 2010-18375 A, a resupply rack is provided in the upper space of a fixed picking operation rack and a device to which articles from the resupply rack are supplied is used, but the racks cannot be moved. Thus, if there are movable racks, articles cannot be resupplied to such racks, and the picking operation efficiency and spatial use efficiency are reduced.

SUMMARY

The present invention is a picking system using movable racks by which work efficiency is improved and spatial use efficiency is increased.

A data picking system and a picking method for picking articles which are aspects of the invention disclosed in the present application are a picking system and a picking method for picking articles that perform work support according to a work section in physical distribution, wherein the picking system comprises: a processor that executes a program; a storage device that stores the program; and a communication interface that communicates with a movement device that moves a conveyance rack that stores an article and a terminal of a work station at which work is to be performed on the conveyance rack, wherein the storage device has rack inventory information that stores the article in the conveyance rack and the work section pertaining to the storage position of the article, and work station information that stores information indicating whether a first storage position of the conveyance rack is accessible at the work station, and wherein the processor receives an order indicating a specific article, searches, from the rack inventory information, the first storage position where the specific article is stored, generates work instruction data pertaining to a specific work section for instructing movement of the specific article from the first storage position to a second storage position of the conveyance rack, searches for a specific work station where work in the specific work section can be performed by accessing the first storage position, with reference to the work station information, transmits the work instruction data to the terminal of the specific work station, and transmits, to the movement device, conveyance instruction data for instructing the conveyance of the conveyance rack to the specific work station.

A data picking system and a picking method for picking articles which are other aspects of the invention disclosed in the present application are a picking system and a picking method for picking articles that perform work support according to a work section in physical distribution, wherein the picking system comprises: a processor that executes a program; a storage device that stores the program; a communication interface that communicates with a movement device that moves a conveyance rack that stores an article and a terminal of a work station at which the work support is to be performed on the conveyance rack; and a conveyance system including a conveyance device that conveys the article, the conveyance device being located above a storage area where the conveyance rack is located, wherein the storage device has rack inventory information that stores the article in the conveyance rack and the work section pertaining to the storage position of the article, and wherein the processor searches the rack inventory information for a conveyance rack that is a storage destination to store an article to be stored, controls the conveyance device and conveys the article to be stored to above the conveyance rack that is the storage destination for the article to be stored, and stores the article to be stored in an upper storage position of the conveyance rack that is the storage destination.

According to a representative embodiment of the present invention, in a picking system using movable racks, work efficiency is improved and spatial use efficiency is increased.

BRIEF DESCRIPTION OF THE DRAWINGS

FIG. 6 is a descriptive view showing an example of an order management table.

FIG. 7 is a descriptive view showing an example of an article information management table.

FIG. 16 is a descriptive view showing an example of a rack inventory information management table of Embodiment 2.

EMBODIMENT 1

<Example of Delivery Operation>

Figure 1:
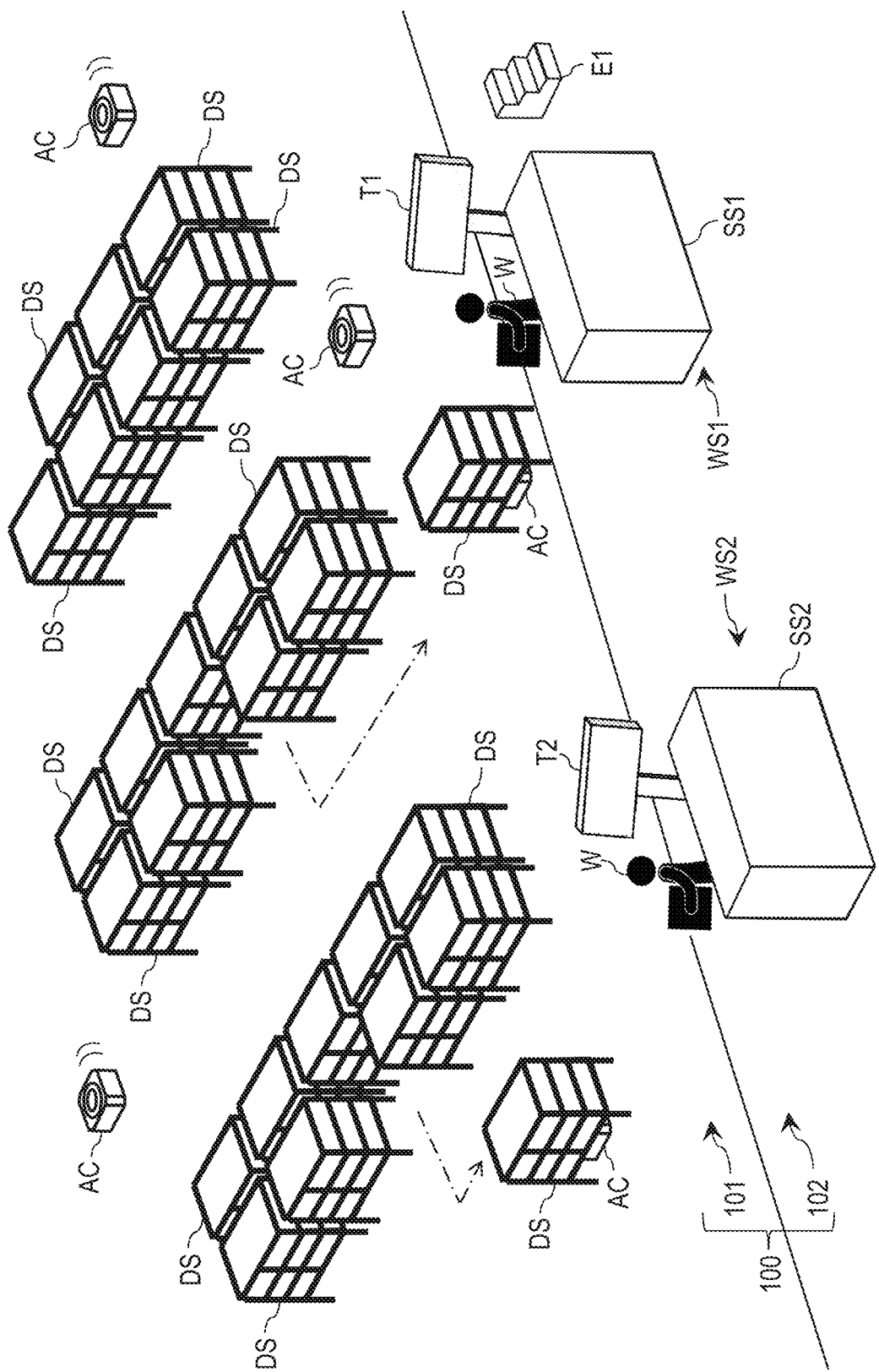
FIG. 1 is a descriptive drawing showing an example of a delivery operation in a warehouse.

FIG. 1 is a descriptive drawing showing an example of a delivery operation in a warehouse. A warehouse 100 has a storage area 101 for articles, and a work area 102. The storage area 101 has disposed therein a plurality of conveyance racks DS. Each conveyance rack DS has placed therein one or more types of articles. In the storage area 101 are a plurality of conveyance vehicles AC. The conveyance vehicles AC move according to controls from a management apparatus 302 to be described later.

Specifically, the conveyance vehicle AC moves to a designated conveyance rack DS. Once the conveyance vehicle AC moves directly underneath the conveyance rack DS, it raises the conveyance rack directly upward by a jack mechanism (not shown) provided on the top surface of the conveyance vehicle AC. Then, the conveyance vehicle AC moves to a designated work station WS1 or WS2 in the work area 102 while holding up the conveyance rack DS. In the description, the term "work station WS" is used if not distinguishing between the work stations WS1 and WS2. When the conveyance vehicle AC reaches the work station WS, it lowers the conveyance rack DS to the floor. When the delivery operation is completed, the conveyance vehicle AC once again raises the conveyance rack DS and returns it to its original location. In Embodiment 1, the conveyance vehicle AC is used as the moving device for moving the conveyance racks DS, but a conveyance vehicle AC may be fixed to each conveyance rack DS.

The work area 102 has a plurality of work stations WSi (i is an integer of 1≤i≤n is an integer of 2 or greater, and indicates the total number of work stations WS. In this example, n=2). The work station WSi has a terminal Ti and a sorting rack SSi. The terminal Ti is a computer that displays information and that is operated by a worker Wi. The sorting rack SSi is a rack on which articles picked from the conveyance rack DS are placed.

A work support tool Ei is a tool for supporting a picking operation or resupply operation by a worker to be performed on a conveyance rack DS. Specifically, for example, the work support tool Ei is a stool, stepladder, ladder, scaffolding, or workbench. By using the work support tool Ei, the worker can pick or store articles from places such as the top of the conveyance rack DS where the worker would not otherwise be able to reach.

<Article Resupply Example>

Figure 2:
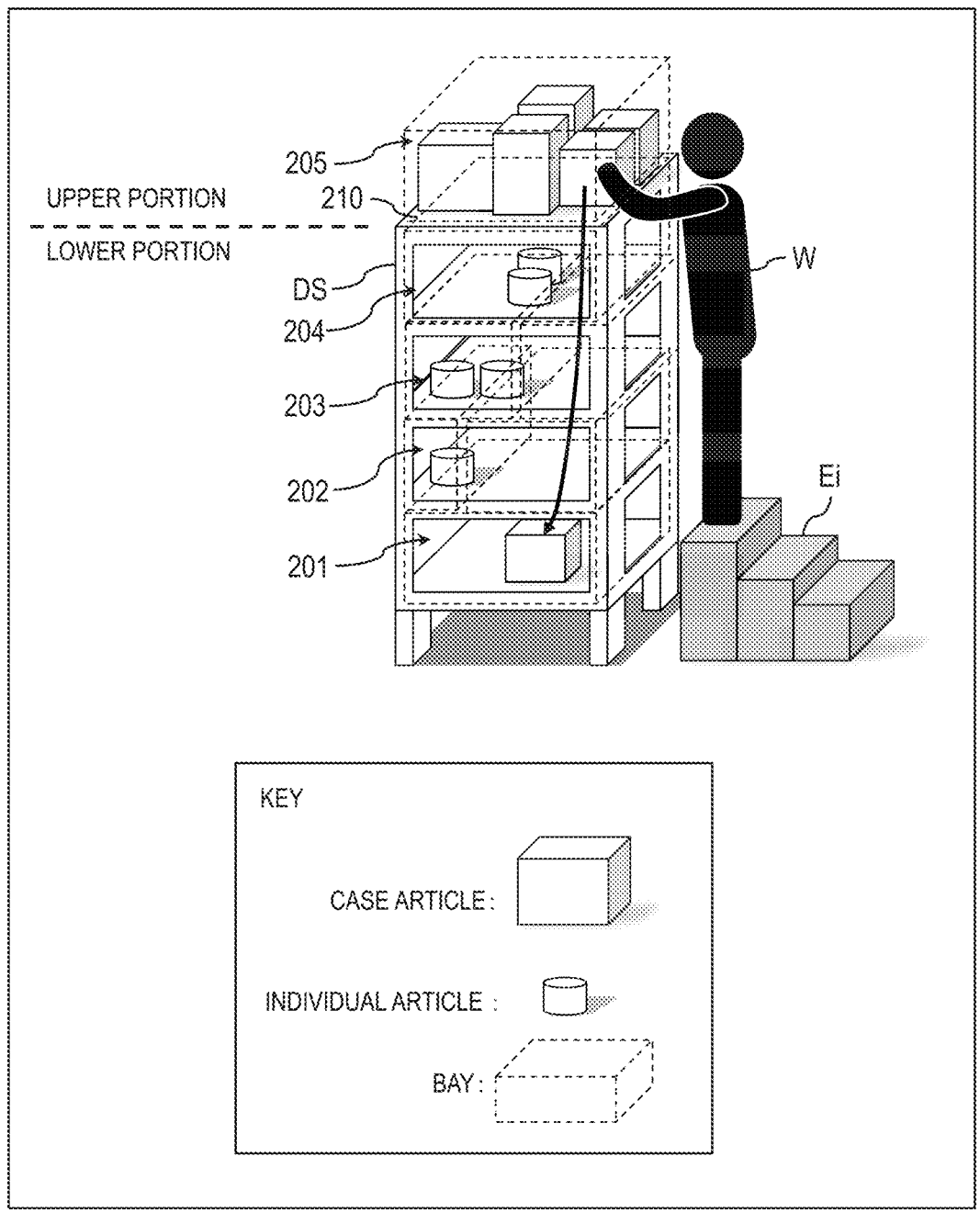
FIG. 2 is a descriptive drawing showing an article resupply example. The conveyance racks DS have articles stored thereon.

FIG. 2 is a descriptive drawing showing an article resupply example. The conveyance racks DS have articles stored thereon. The conveyance racks DS have a plurality of shelves 201 to 205 (including the fifth shelf (top surface) in FIG. 2). The conveyance rack DS is divided into an upper portion and a lower portion. The upper portion is a resupply shelf and the bottom portion is the picking shelves. The resupply shelf has stored thereon articles for resupply, and the picking shelves have stored thereon articles to be picked. The boundary between the upper and lower portions is defined arbitrarily. In this example, the top surface 210 is set as the boundary, and the topmost shelf 205 is set as the upper portion, that is, the resupply shelf, but the shelf board between the shelf 203 and the shelf 204 may be set as the boundary, for example.

Each type of article is stored in a unit known as a bay. A bay is a storage location for articles that forms a three-dimensional region where each shelf is divided into one or more regions (rectangular cuboid indicated with dotted line in FIG. 2). The bay in the picking shelf is referred to as a picking bay. The bay in the resupply shelf is referred to as a resupply bay. The picking bay is a bay that can be accessed by a worker W during normal work (without using the work support tool Ei), and the resupply bay is a bay that can be accessed by the worker W using the work support tool Ei.

If the picking shelf is set at the upper portion of the conveyance rack DS, the work support tool Ei would need to be used for picking, which reduces work efficiency. Thus, the upper portion is a resupply shelf, which has a low frequency of access. When the conveyance rack DS is conveyed to the work area, the worker picks articles from the conveyance rack DS and stores the articles in the sorting shelf SSi or performs a resupply operation for the conveyance rack DS according to work instructions.

The picking bay stores articles known as individual articles. Individual articles are articles stored in units of one. That is, individual articles are stored one per package. Individual articles are also referred to as piece articles. The resupply bay stores articles known as case articles. Case articles are groups of articles that are stored such that a plurality of the same type of articles are stored together. That is, a plurality of case articles are stored per package. FIG. 2 shows a resupply operation in which a worker uses the work support tool Ei to lower a case article stored in the resupply bay at the topmost shelf of the conveyance rack DS to the picking bay at the lowermost shelf.

<Example of Picking System>

Figure 3:
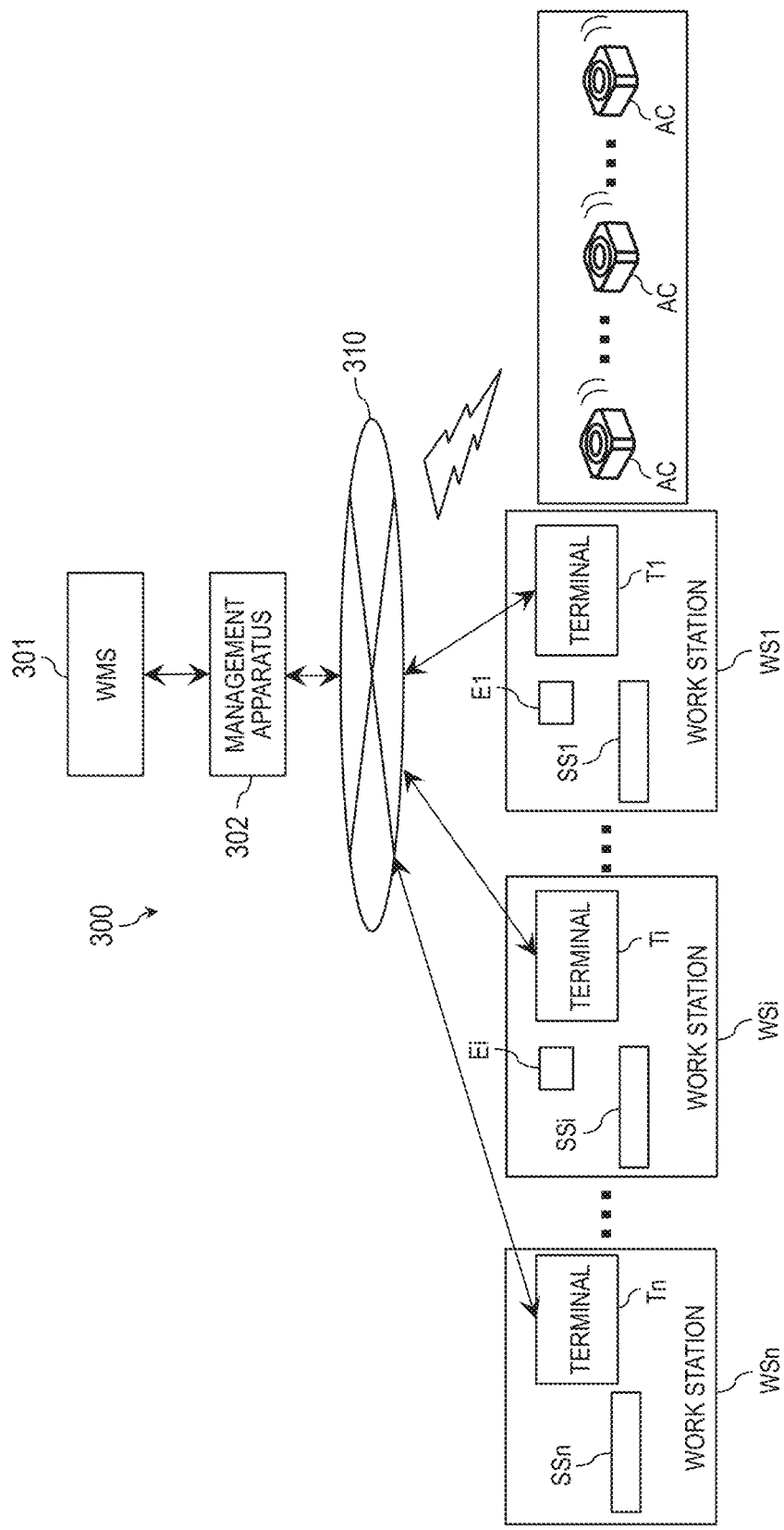
FIG. 3 is a descriptive view showing an example of a picking system.

FIG. 3 is a descriptive view showing an example of a picking system. The picking system 300 has a warehouse management system 301 (WMS), a management apparatus 302, conveyance vehicles AC, and work stations WSi. The work station WSi has a terminal Ti and a sorting rack SSi. There are some work stations WSi having the work support tool Ei. The WMS 301 is connected to one or more management apparatuses 302 in a manner enabling communication. The management apparatus 302, the conveyance vehicles AC, and the terminals Ti are connected through a network 310 in a manner enabling communication. At least the conveyance vehicles AC are connected to the management apparatus 302 through the network 310 in a manner enabling wireless communication. The WMS 301 controls the management apparatus 302. Specifically, the WMS 301 transmits orders to the management apparatus 302. Such orders include information such as the name of the article, the number of such articles, the shape of the articles, and the customer.

The management apparatus 302 controls the picking operation and the resupply operation. Control of the picking operation and the resupply operation will be described later. The management apparatus 302 controls the conveyance of the conveyance rack DS by the conveyance vehicle AC.

The management apparatus 302 has coordinate information of the storage area 101 and manages the current position information of each conveyance rack DS. The floor space of the storage area 101 is partitioned by a two-dimensional mesh, for example, and the management apparatus 302 manages the coordinate values of the center of each mesh cell (the vertex coordinate values of the mesh cell may be managed instead of the center). Each mesh cell has a marker including the coordinate value of the mesh cell. The marker is a barcode (including two-dimensional codes) that is pasted or coated onto the mesh cell. The barcode is information in which the mesh coordinate value is incorporated.

The management apparatus 302 manages the movement of the conveyance vehicles AC. Specifically, the management apparatus 302 identifies the conveyance rack DS in which the article to be delivered is stored, and calculates route information to the work station WSi through the identified conveyance rack DS, for example. The management apparatus 302 transmits route information to a given conveyance vehicle AC, for example, the closest conveyance vehicle AC to the identified conveyance rack DS, and issues an instruction to the conveyance vehicle to move according to the route information.

The conveyance vehicle AC is a moving device that conveys the conveyance rack DS. The conveyance vehicle AC scans the floor surface while in motion, and acquires the coordinate values thereof by scanning a barcode when passing between mesh cells. The conveyance vehicle AC transmits the acquired coordinate values to the management apparatus 302. As a result, the management apparatus 302 manages the current position of the conveyance vehicles AC. Also, the conveyance vehicle AC can be provided with a measurement system such as sonar or a laser scanner, for example, and travel while sequentially estimating its own position without using markers. The conveyance rack DS is moved by the conveyance vehicle AC, but the conveyance rack DS itself may be provided with a moving device similar to the conveyance vehicle AC.

The management apparatus 302 determines whether the coordinate values of the current position of the conveyance vehicle AC match the coordinate values of the mesh cell in which the conveyance rack DS to be conveyed is disposed. If the coordinate values match, the management apparatus 302 transmits lift-up command information to the conveyance vehicle AC. Upon receipt of the lift-up command information, the conveyance vehicle AC raises the conveyance rack DS using a jack. The conveyance vehicle AC then moves to the work station WSi, which is the target arrival location thereof.

The management apparatus 302 determines whether the coordinate values of the current position of the conveyance vehicle AC match the coordinate values of the mesh cell in front of the work station WSi that is the target arrival location. If the coordinate values match, the management apparatus 302 transmits lift-down command information to the conveyance vehicle AC. Upon receipt of the lift-down command information, the conveyance vehicle AC stops and lowers the conveyance rack DS to the floor using a jack.

Upon receipt of picking operation completion information from the conveyance rack DS, the management apparatus 302 transmits lift-up command information and withdrawal command information to the conveyance vehicle AC. Upon receipt of the lift-up command information, the conveyance vehicle AC once again lifts up the conveyance rack DS, and upon receipt of the withdrawal command information, the conveyance vehicle AC while continuing to hold up the conveyance rack DS moves to the original location where the conveyance rack DS was disposed according to the route information.

The management apparatus 302 determines whether the coordinate values of the current position of the conveyance vehicle AC match the coordinate values of the position where the conveyance rack DS was originally disposed. If the coordinate values match, the management apparatus 302 transmits lift-down command information to the conveyance vehicle AC. Upon receipt of the lift-down command information, the conveyance vehicle AC lowers the conveyance rack DS to the floor using a jack. The conveyance vehicle AC then clears the route information.

<Example of Hardware Configuration>

Figure 4:
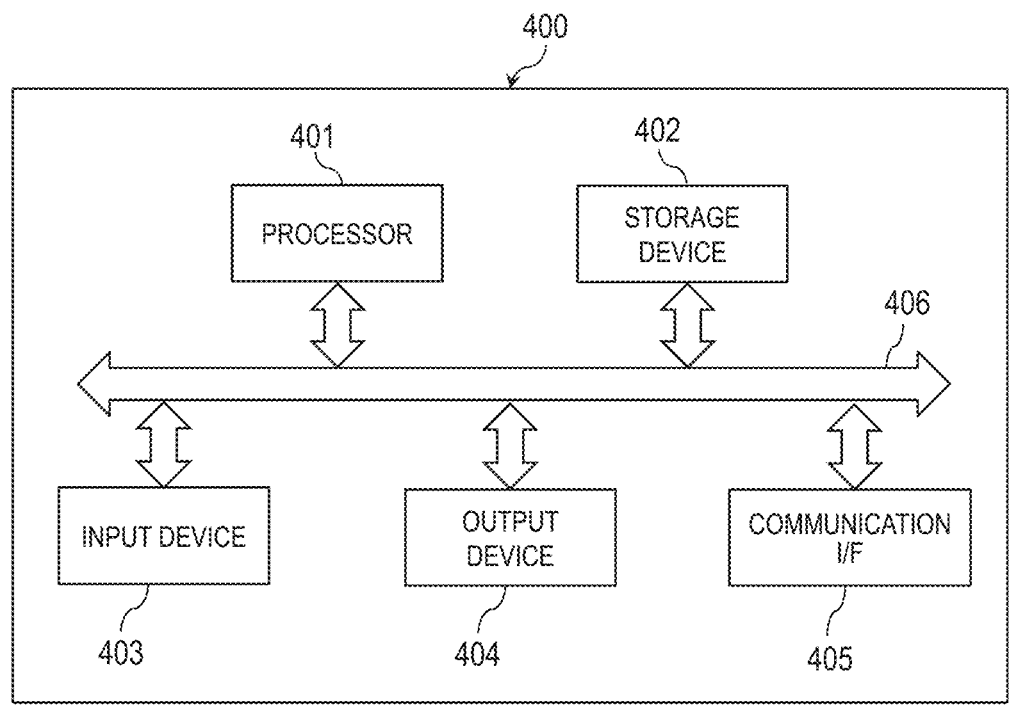
FIG. 4 is a block diagram illustrating a hardware configuration example of the computer.

FIG. 4 is a block diagram illustrating a hardware configuration example of the WMS 301, the management apparatus 302, and the terminal Ti (hereinafter simply referred to as "a computer 400"). The computer 400 includes a processor 401, a storage device 402, an input device 403, an output device 404, and a communication interface (communication IF) 405. The processor 401, the storage device 402, the input device 403, the output device 404, and the communication IF 405 are connected to one another by a bus 406. The processor 401 controls the computer 400. The processor 401 executes various programs. The storage device 402 serves as a work area of the processor 401. The storage device 402 is a recording medium which stores the various programs and data. The storage device 402 can be, for example, a read-only memory (ROM), a random access memory (RAM), a hard disk drive (HDD), or a flash memory. The input device 403 inputs data. The input device 403 can be, for example, a keyboard, a mouse, a touch panel, a ten-key pad, or a scanner. The output device 404 outputs data. The output device 404 can be, for example, a display or a printer. The communication IF 405 couples to a network to transmit and receive data. Now, a description is given of an embodiment of this invention.

Figure 5:
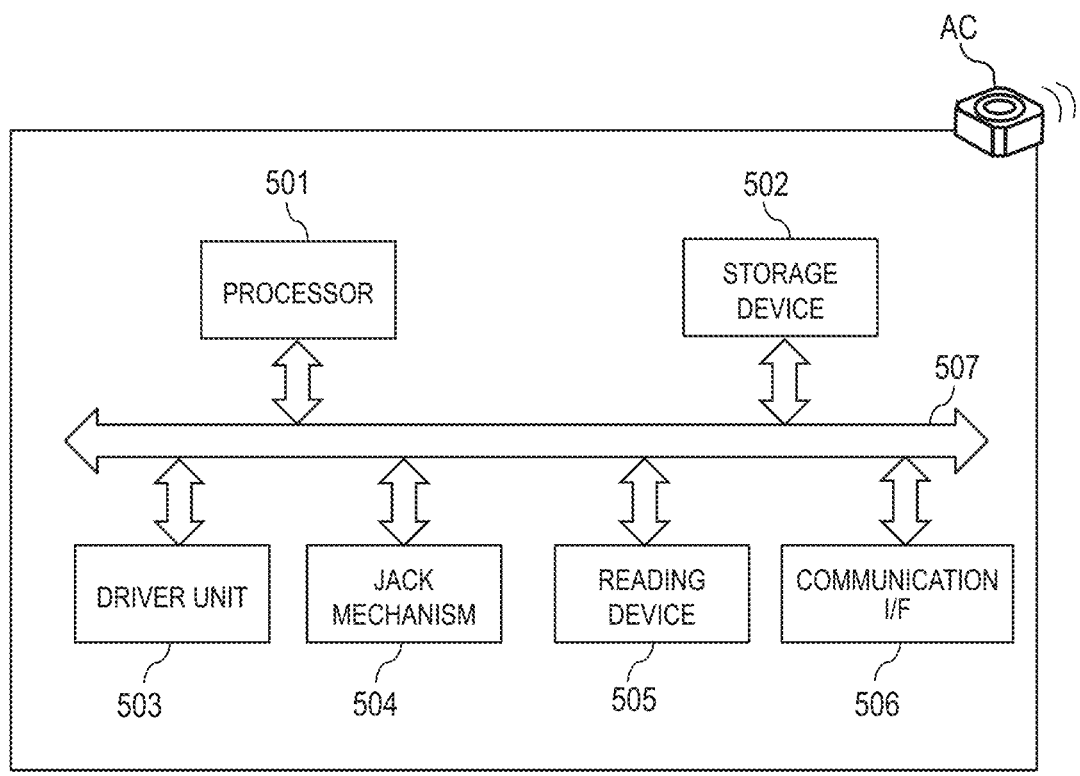
FIG. 5 is a block diagram for showing a hardware configuration example of the conveyance vehicle.

FIG. 5 is a block diagram for showing a hardware configuration example of the conveyance vehicle AC. The conveyance vehicle AC has a processor 501, a storage device 502, a driving unit 503, a jack mechanism 504, a reading device 505, and a communication I/F 506. The processor 501, the storage device 502, the driving unit 503, the jack mechanism 504, the reading device 505, and the communication I/F 506 are connected by a bus 507. The processor 501 controls the conveyance vehicle AC. The storage device 502 is the work area of the processor 501. Also, the storage device 502 is a non-transitory or transitory recording medium that stores various programs and data. Examples of such a storage device 502 include, for example, ROM, RAM, an HDD, or a flash memory.

The driving unit 503 moves, rotates, or stops the conveyance vehicle AC according to controls from the processor 501. The jack mechanism 504, upon receipt of lift-up command information, jacks up the conveyance rack DS, and upon receipt of the lift-down command information, jacks down the conveyance rack DS, according to controls by the processor 501. The reading device 505 reads markers on the floor surface. If the marker is a barcode, the reading device 505 is a barcode reader. The communication I/F 506 connects to the network 310 and transmits/receives data to/from the management apparatus 302.

<Example of Various Stored Management Information>

An example of various stored management information using during a picking operation and a resupply operation will be described in tabular format with reference to FIGS. 6 to 10. In the description of the tables below, the value of an AA field bbb (AA being the field name and bbb being a reference character) is sometimes expressed as AA bbb. For example, the value of an order ID field 601 is recorded as "order ID 601". The management information shown in FIGS. 6 to 10 is specifically stored in a storage device 402, for example.

FIG. 6 is a descriptive view showing an example of an order management table. The order management table 600 is a table for managing the content of each order. The order management table 600 has an order ID field 601, an article field 602, a number field 603, a form field 604, and a customer field 605. In each row, the combination of values of the fields 601 to 605 constitutes an entry indicating an order.

The order ID field 601 is a storage region that stores the order ID as a value. The order ID 601 is identification information that uniquely identifies the order. The article field 602 is a storage region that stores the article ID indicating the article included in the order, as a value. The number field 603 is a storage region that stores the number of articles 602 included in the order, as a value. The form field 604 is a storage region that stores the form of articles 602 included in the order, as a value. The form 604 is a unit for counting the articles, where if the form is individual articles, the unit is one article, and if the form is a case, the unit is a plurality of articles (10, for example) per case. The relationship of individual versus case is defined for each article (described later with reference to FIG. 7). A configuration may be adopted in which if there is no designation of form 604, the form is assumed to be individual articles. In an actual order, there are some orders in which the form 604 is "case", but in orders dealt with in Embodiment 1, all orders are "individual". The customer field 605 is a storage region that stores the customer information identifying the customer who made the order, as a value.

Here, the entry 61 is an order in which the order ID 601 is "ID001", and there are two (number 603, form 604) articles A (article 602), the order having been received from a customer C1 (customer 605). The entry 62 is an order in which the order ID 601 is "ID002", and there is one (number 603, form 604) article B (article 602), the order having been received from a customer C2 (customer 605).

FIG. 7 is a descriptive view showing an example of an article information management table. The article information management table 700 is a table for managing information for each article. The article information management table 700 has a management ID field 701, an article field 702, a size field 703, a weight field 704, and a package unit field 705. In each row, the combination of values of the fields 701 to 705 constitutes an entry indicating article information.

The management ID field 701 is a storage region that stores the management ID as a value. The management ID 701 is identification information that uniquely identifies the article information. The article field 702 is a storage region that stores the article ID indicating the article related to the article information, as a value. The size field 703 is a storage region that stores the size per article 702, as a value. The weight field 704 is a storage region that stores the weight per article 702, as a value. The package unit field 705 is a storage region that stores the package unit of the article 702, as a value. If the form 604 of the article 702 (602) is "case", then the package unit 705 is the number of individual articles for when the articles 702 are counted per case. That is, the form 604 defines the package unit 705 of the article 702.

Regarding the article A in entry 71, the form 604 of the article A is "individual", for example, but if the form is "case", then the package unit 705 of the article A is "50". Thus, the article A is defined as 50 items per case. Similarly, regarding the article B in entry 72, the form 604 of the article B is also "individual", for example, but if the form is "case", then the package unit 705 of the article B is "100". Thus, the article B is defined as 100 items per case.

Figure 8:
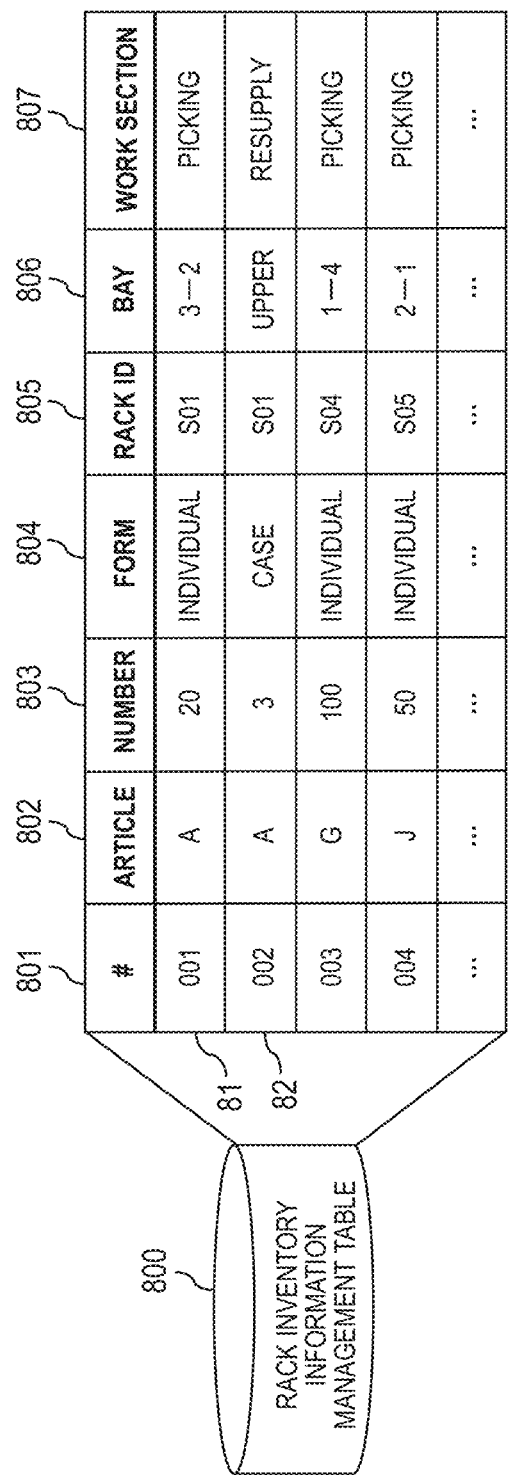
FIG. 8 is a descriptive view showing an example of a rack inventory information management table.

FIG. 8 is a descriptive view showing an example of a rack inventory information management table. The rack inventory information management table 800 is information for managing the inventory state in a conveyance rack DS for each storage location in the conveyance rack DS. The rack inventory information management table 800 has a management ID field 801, an article field 802, a number field 803, a form field 804, a rack ID field 805, a bay field 806, and a work section field 807. In each row, the combination of values of the fields 801 to 807 constitutes an entry indicating rack inventory information.

The management ID field 801 is a storage region that stores the management ID as a value. The management ID 801 is identification information that uniquely identifies the rack inventory information as a value. The article field 802 is a storage region that stores the article ID indicating the article stored in the storage location identified by the entry, as a value. The number field 803 is a storage region that stores the number of articles 802 stored in the storage location identified by the entry, as a value.

The form field 804 is a storage region that stores the form of the article 802 stored in the storage location identified by the entry, as a value. The rack ID field 805 is a storage region into which rack IDs of the conveyance racks DS are stored. The rack ID 805 is identification information that uniquely identifies the conveyance rack DS in which the articles 802 are stored. The bay ID 806 is identification information that uniquely identifies the bay in the conveyance rack DS having the rack ID 805 in which the articles 802 are stored. The storage position of the article 802 is defined by the combination of rack ID 805 and bay 806.

The work section field 807 is a storage region into which the work section is stored as a value. The work section 807 is information that defines the type of bay 806 in the conveyance rack DS having the rack ID 805. If, for example, the work section 807 is "picking", the bay 806 is defined as the picking bay, and if the work section 807 is "resupply", then the bay 806 is defined as the resupply bay.

When describing the entry 81, rack inventory information where the management ID 801 is "001" indicates that 20 (number 803) articles A (article 802) are stored in individual units (form 804), in the picking bay "3-2" (bay 806, work section 807) of the conveyance rack DS where the rack ID 805 is "S01". Regarding the entry 82, rack inventory information where the management ID 801 is "002" indicates that 3 cases (number 803, form 804) of articles A (article 802) are stored in the resupply bay "upper" (bay 806, work section 807) of the conveyance rack DS where the rack ID 805 is "S01".

Figure 9:
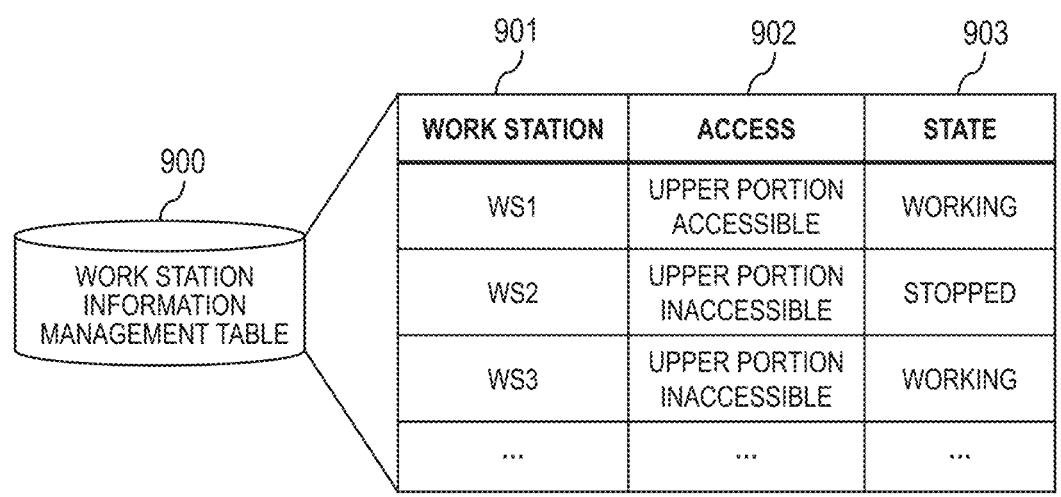
FIG. 9 is a descriptive view showing an example of a work station information management table.

FIG. 9 is a descriptive view showing an example of a work station information management table. The work station information management table 900 is a table for managing information pertaining to each work station WSi. The work station information management table 900 has a work station field 901, an access field 902, and a state field 903.

In each row, the combination of values of the fields 901 to 903 constitutes an entry indicating work station information.

The work station field 901 is a storage region into which information uniquely identifying the work station WSi is stored as a value. The access field 902 is a storage region into which information indicating whether the upper portion of the conveyance rack DS can be accessed is stored. If, for example, the access 902 is set as "upper portion accessible", this indicates that the worker W can access the upper portion of the conveyance rack DS at the work station 801. In other words, it indicates that the work station 801 has a work support tool Ei. The state field 903 is a storage region into which information indicating the work state at the work station 801 is stored as a value. If, for example, the state 803 is "working", this indicates that the worker W is working at the work station 801. If the state 803 is "stopped", this indicates that the worker W is not present at the work station 801.

In other words, when the worker W enters the work station WSi of his/her charge, then he/she enters into the terminal Ti that he/she has started work. By this operation, the terminal Ti transmits a work start notification to the management apparatus 302. The work start notification includes identification information of the work station WSi. When the management apparatus 302 receives the work start notification through the reception unit, it identifies an entry in the work station information management table 900 that matches the identification information of the work station WSi included in the work start information, and updates the state 803 of the entry to "working".

Figure 10:
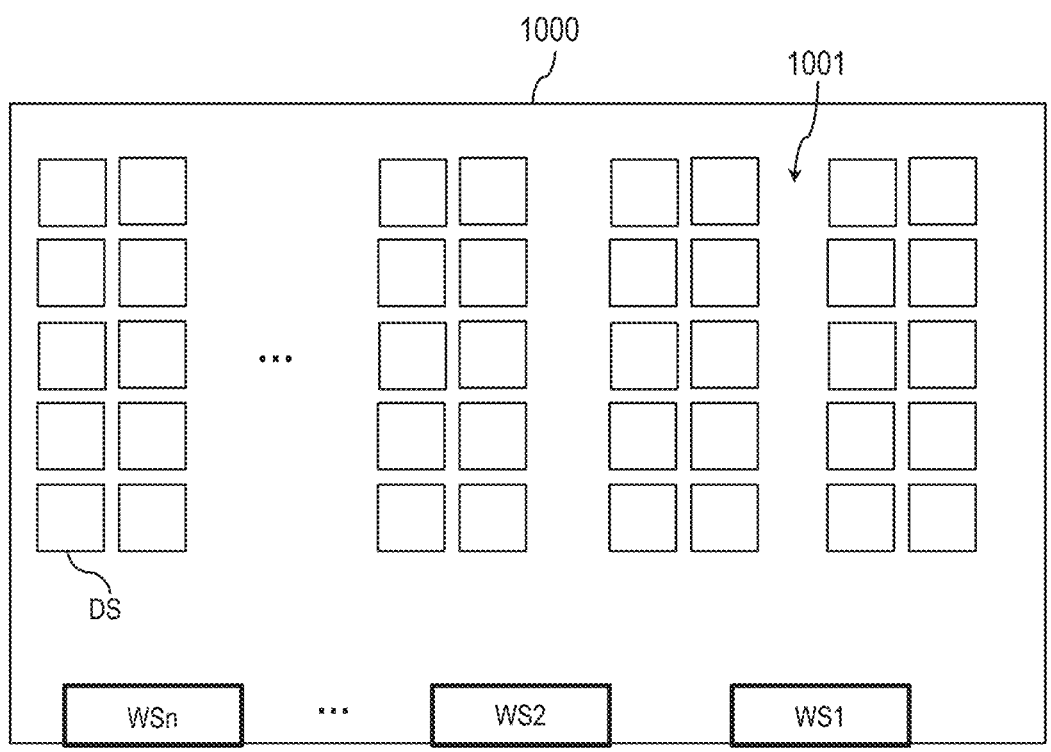
FIG. 10 is a descriptive drawing showing map data in the warehouse.

FIG. 10 is a descriptive drawing showing map data in the warehouse 100. The map data has position information (coordinate values) of the conveyance rack DS, aisles 1001, and the work stations WSi. The conveyance racks DS can be moved, and thus, the current position information may be stored.

<Mechanical Configuration Example of management apparatus 302>

Figure 11:
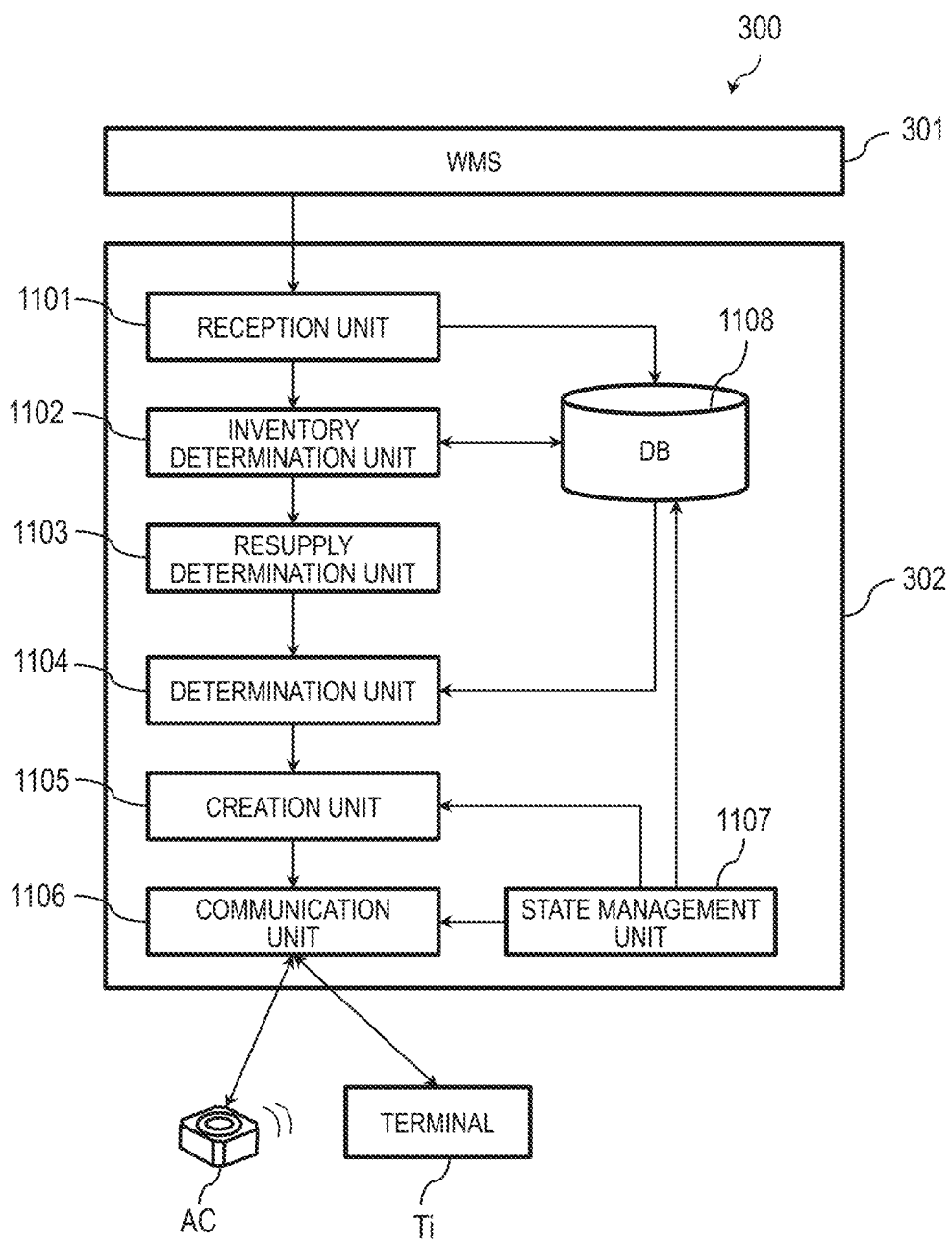
FIG. 11 is a block diagram showing a mechanical configuration example of the management apparatus.

FIG. 11 is a block diagram showing a mechanical configuration example of the management apparatus 302. The management apparatus 302 has a reception unit 1101, an inventory determination unit 1102, a resupply determination unit 1103, a determination unit 1104, a creation unit 1105, a communication unit 1106, a state management unit 1107, and a database 1108 (DB). The reception unit 1101 to state management unit 1107 specifically function by the processor 401 executing programs stored in the storage device 402 shown in FIG. 4, or by the communication I/F 405, for example.

The reception unit 1101 receives an order from the WMS 301. The order includes an order ID, an article ID of the ordered article, the number and form of the article, and customer information. When the reception unit 1101 receives an order, the order is stored as a new entry in the order management table 600.

The inventory determination unit 1102 refers to the rack inventory information management table 800 and searches the rack inventory information management table 800 for an entry including the ordered article received by the reception unit 1101. The inventory determination unit 1102 acquires the rack ID 805 and bay 806 of the entry having the ordered article 802. Specifically, if the ordered article is an article A, for example, then the inventory determination unit 1102 acquires, from the rack inventory information management table 800, the rack ID 805 (S01) and bay 806 (3-2) of the entry 81 having the article A.

The resupply determination unit 1103 identifies the rack ID 805 and bay 806 for which the work section 807 is "picking", from among the rack IDs 805 and bays 806 acquired by the inventory determination unit 1102. The resupply determination unit 1103 then determines whether the given number of articles in the received order are stored in the identified rack ID 805 and bay 806. If the given number of articles are stored, then it is possible to pick from the bay 806, and if the given number of articles are not stored, then there is an inventory shortage, and there is a need to resupply from the resupply bay of the conveyance rack DS of the rack ID 805.

Specifically, the work section 807 of the entry 81 having the article A is "picking", for example. Thus, the resupply determination unit 1103 determines whether the number of articles A in the received order are stored in the rack ID 805 (S01) and bay 806 (3-2) of the entry 81. Here, the number 803 of articles in the entry 81 is "20", and the form 804 is "individual", and thus, there are 20 articles A stored in the bay 806 (3-2) of the conveyance rack DS having the rack ID 805 (S01). If the number of articles A received in the order is 20 or less, then picking is possible. However, if the number exceeds 20, then picking is not possible, that is, there is an inventory shortage, and thus, it is necessary to resupply from the resupply bay of the conveyance rack DS having the rack ID 805 (S01).

If it is determined that picking is possible, the resupply determination unit 1103 generates picking operation instruction data. The picking operation instruction data is data for instructing the worker W to undertake the picking operation. Specifically, if the number of articles A in the received order is "12", for example, then the resupply determination unit 1103 generates picking operation instruction data stating "pick 12 of article A from picking bay '3-2' of conveyance rack DS with rack ID 805 of 'S01'".

If it is determined that there is an inventory shortage, the resupply determination unit 1103 searches, in the rack inventory information management table 800, for an entry where the article 802 and the rack ID 805 match and the work section 807 is "resupply". If, for example, the article in the received order is the article A as described above, the resupply determination unit 1103 searches for an entry 82 where the article 802 is "A" and the rack ID 805 is "S01".

Then, similar to above, the resupply determination unit 1103 then determines whether the number of articles A in the received order are stored in bay 806 identified in the entry where the work section 807 is "resupply". In the above example, the number 803 of articles in the entry 82 where the work section 807 is "resupply" is "3", and the form 804 is "case". That is, there are three cases of articles A present in the resupply bay in the upper portion of the conveyance rack DS having a rack ID 805 of "S01".

Thus, because the form 804 is "case", the resupply determination unit 1103 accesses the article information management table 700 and identifies an entry having the article 702 in the received order where the package unit 705 is not "1". If the article 702 is the article A, for example, then an entry 72 where the package unit 705 is "50" is identified. That is, if the form 604 of the article A is "case", then the article A is 50 items per case.

The resupply determination unit 1103 uses the package unit 705 of the identified article information management table 700, and the number 803 of articles in the entry 82 where the work section 807 is "resupply", and calculates the number of articles, for which the order was received, stored in the resupply bay. Regarding the article A in the entry 71, for example, the package unit 705 of the identified article information management table 700 is "50", and the number 803 of articles in the entry 82 where the work section 807 is "resupply" is "3". Thus, the resupply determination unit 1103 calculates the number of ordered articles A stored in the resupply bay as "150" (50×3).

The resupply determination unit 1103 determines whether the article for which the order was received can be resupplied from the resupply bay. That is, the resupply determination unit 1103 determines whether the number of articles for which the order was received is encompassed in the calculated number of articles. The resupply determination unit 1103 determines whether the number of articles A in the order is encompassed in "150". If not, resupply is not possible, or in other words, there is an inventory shortage, and the resupply determination unit 1103 issues a notification to the WMS 301 indicating an inventory shortage.

On the other hand, if the number is included, then resupply is possible. Thus, the resupply determination unit 1103 generates resupply operation instruction data instructing the resupply of at least the number of articles by which the articles are short from the resupply bay to the picking bay. The resupply operation instruction data is data for instructing the worker W to undertake the resupply operation. The number of articles by which the articles are short is calculated by subtracting the number of the same article present in the picking bay from the number of articles in the order. In this specific example, the number of articles A is short by six.

In such a case, the resupply determination unit 1103 generates resupply operation instruction data stating "pick 6 of article A from resupply bay at upper portion of conveyance rack DS with rack ID 805 of 'S01' and transfer to picking bay '3-2' of same conveyance rack DS".

The determination unit 1104 determines the work station WSi where the picking operation or resupply operation is to be performed. Specifically, if the determination unit 1104 determines that there is sufficient inventory in the resupply determination unit 1103, for example, then the ordered article is picked from the picking bay. Thus, the determination unit 1104 accesses the work station information management table 900 and determines the work station WSi where the picking operation is to be performed from among the work stations 801 where the state 803 is "working".

If the resupply determination unit 1103 determines that there is an inventory shortage and that resupply from the resupply bay is possible, the worker W needs to take the articles from the upper portion of the conveyance rack DS. Thus, the determination unit 1104 accesses the work station information management table 900 and determines the work station where the resupply operation is to be performed from among work stations 801 where the state 803 is "working" and the access 902 is set as "upper portion accessible". The work station 801 where the access 902 is set as "upper portion accessible" is a work station WSi having the work support tool Ei.

The creation unit 1105 refers to map data 1000 and identifies the current location of the conveyance rack DS to be conveyed, the location of the work station WSi determined by the determination unit 1104 to be the conveyance destination of the conveyance rack DS, and the current location of the conveyance vehicles AC. If there are a plurality of conveyance vehicles AC in operation, the creation unit 1105 determines the conveyance vehicle AC to perform the conveyance operation according to a prescribed selection standard. The conveyance operation is an operation in which the conveyance rack DS is conveyed to the work station WSi, and then returned to the storage area 101 (original location, for example) after completion of the picking or resupply operation. The selection standard is, for example, whichever of the conveyance vehicles AC, not currently performing the conveyance operation, is closest to the conveyance rack DS to be conveyed.

The creation unit 1105 then uses a known technique such as a shortest path search to create route information starting from the selected conveyance vehicle AC, passing through the conveyance rack DS to be conveyed, and to the work station WSi determined by the determination unit 1104.

The communication unit 1106 transmits the route information created by the creation unit 1105 to the moving device. Specifically, for example, the communication unit 1106 transmits the route information to the conveyance vehicle AC. Also, the communication unit 1106 adds the conveyance vehicle ID of the conveyance vehicle AC to convey the conveyance rack DS to the picking operation instruction data or resupply operation instruction data generated by the resupply determination unit 1103, and transmits the data to the terminal Ti of the work station WSi determined by the determination unit 1104. As a result, the terminal Ti displays the received work instruction data in the display.

When the route information from the management apparatus 302 is received, the conveyance vehicle AC moves to the conveyance rack DS to be conveyed according to the route information and lifts up the conveyance rack DS. The conveyance vehicle AC then moves according to the route information to the work station WSi that is the destination indicated in the route information while holding up the conveyance rack DS. When the conveyance vehicle AC reaches the work station WSi, it lowers the conveyance rack DS and stands by.

The state management unit 1107 receives the conveyance information of the conveyance vehicle AC from the conveyance vehicle AC and manages the information. The conveyance information is transmitted from the conveyance vehicle AC to the management apparatus 302 at a prescribed timing. The conveyance information of the conveyance vehicle AC includes, for example, the current position of the conveyance vehicle AC, a conveyance operation flag, the rack ID of the conveyance rack DS handled by the conveyance vehicle, and an arrival flag indicating arrival to the work station WSi.

The conveyance operation flag is a flag indicating whether the conveyance vehicle AC has received the conveyance operation for the conveyance rack DS. If the route information is received, the conveyance vehicle AC sets the conveyance operation flag to ON, and if the conveyance vehicle AC is returned, the conveyance operation flag is set to OFF. The creation unit 1105 of the management apparatus 302 acquires the conveyance information from each conveyance vehicle AC and selects the conveyance vehicle AC to perform the conveyance operation, from among conveyance vehicles AC where the conveyance operation flag is OFF.

The arrival flag is a flag indicating whether the conveyance vehicle AC undertaking the conveyance operation (conveyance operation flag ON) has arrived at the destination work station WSi. The conveyance vehicle AC refers to the route information, and if it has arrived at the destination work station WSi, it sets the arrival flag to ON, and if returning of the conveyance vehicle AC has started, it sets the conveyance operation flag to OFF.

The terminal Ti communicates with the communication unit 1106 of the management apparatus 302. Upon receipt of work instruction data, the terminal Ti displays the received work instruction data in the display. The worker W under-takes the picking operation or resupply operation in the conveyance rack DS according to the work instruction data. In the case of the resupply operation, the worker W may move the article taken from the resupply bay to the picking bay for this article, or move the article to another open picking bay.

In such a case, the worker W reads in the barcode of the product using the barcode reader of the terminal Ti. The worker W inputs, into an input device 403 of the terminal Ti, the bay ID of the bay where the operation is being performed. If a barcode in which the bay ID of the bay is embedded is present on the bay, the worker W may read the barcode using a barcode reader. The terminal Ti transmits, to the management apparatus 302, a work completion notification including the product ID, number of products, rack ID, bay ID, and work section of the product received through the barcode reader or another input device 403. In such a case, the management apparatus 302 uses the received work completion notification to update the number 803 of articles in the rack inventory information management table 800.

If the conveyance rack DS is present at the work station WSi, the worker W may perform an article adding operation on the conveyance rack DS. The article adding operation is an operation in which articles stored in another conveyance rack DS or articles that have arrived from outside to another work station WSj (j≠i) are added to the conveyance rack DS. When adding in units of individual articles, the worker W stores the products to be added to the picking bay if such a picking bay for the product to be added exists. If no such a picking bay for the product to be added exists, the worker W stores the products to be added to an open picking bay.

When adding in case units as well, the worker W stores the products to be added to the resupply bay if such a resupply bay for the product to be added exists. If no such a resupply bay for the product to be added exists, the worker W stores the products to be added in case units to an open resupply bay.

The terminal Ti transmits article addition information to the management apparatus 302 according to an input by the worker W. The article addition information is information pertaining to the added article, and includes, for example, the article ID of the added article, the added number of articles or cases, storage position (rack ID and bay ID), and the work section. If the added article is an article that has not yet been stored, then the size, weight, and package unit of the added article are also added as article addition information. Upon receipt of the article addition information, the management apparatus 302 updates the rack inventory information management table 800. If the article has not yet been stored, the management apparatus 302 also updates the article information management table 700. In Embodiment 1, if articles are resupplied from cases, the number of articles in the case is less than the maximum number, but by the addition of articles described above, the amount by which the articles are short is added to the case.

If the terminal Ti receives a return instruction from the worker W, it uses the conveyance vehicle ID included in the work instruction data, identifies the conveyance vehicle AC standing by at the work station WSi, and transmits return instruction data to the conveyance vehicle AC. Upon receipt of the return instruction data the conveyance vehicle AC lifts up the conveyance rack DS. The conveyance vehicle AC then turns OFF the conveyance operation flag and returns the conveyance rack DS to its original location.

<Example of Work Support Process Steps>

Figure 12:
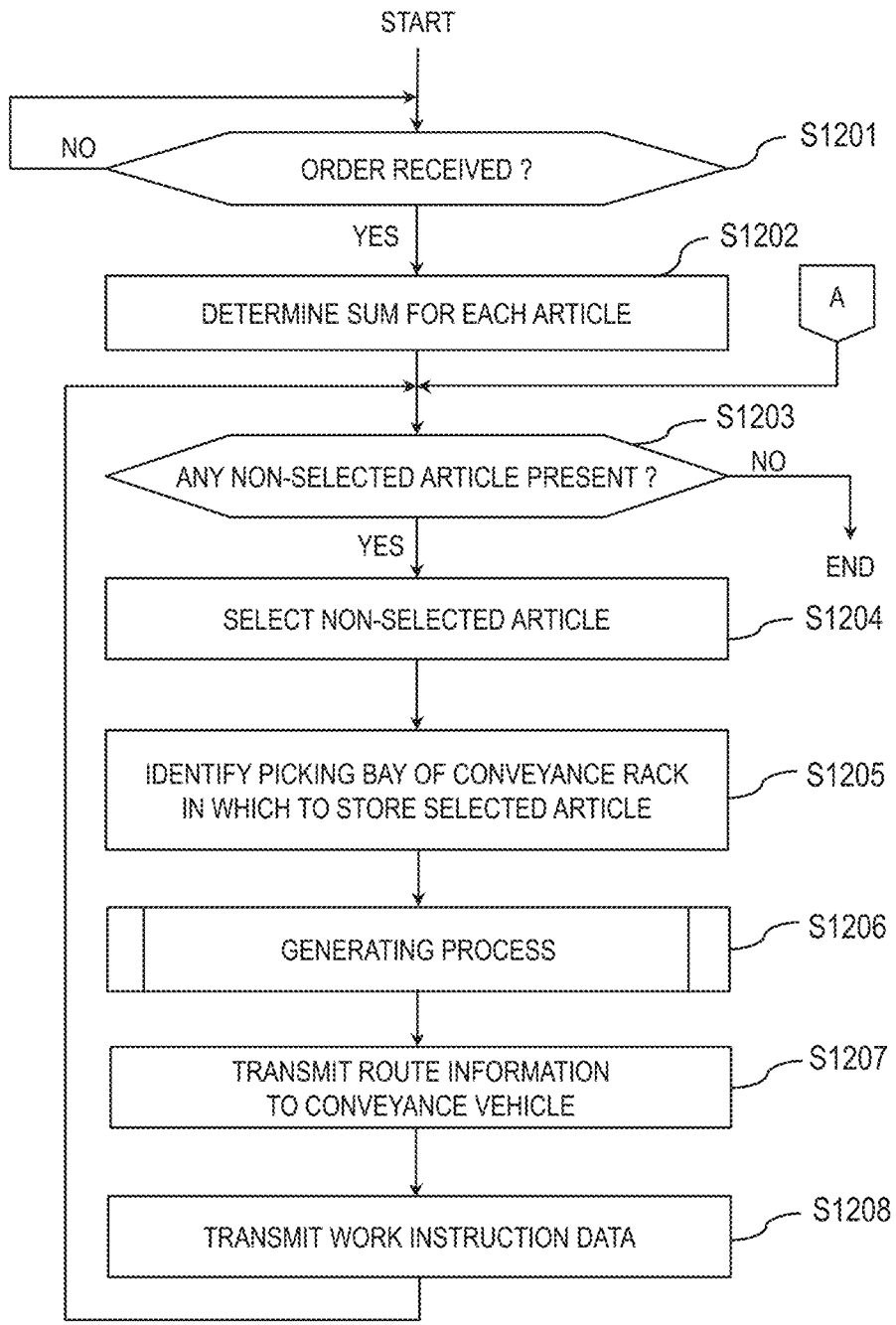
FIG. 12 is a flowchart showing an example of work support process steps by the management apparatus according to Embodiment.

FIG. 12 is a flowchart showing an example of work support process steps by the management apparatus 302 according to Embodiment 1. The management apparatus 302 waits for orders from the WMS 301 (step S1201: No), and when it receives an order (step S1201: Yes), the management apparatus 302 determines the total number of articles for each type of article 602 (step S1202). This total is referred to as the number of ordered articles. The management apparatus 302 determines whether there is any non-selected article from among the ordered articles (step S1203).

If there is a non-selected article (step S1203: Yes), the management apparatus 302 selects the non-selected article (step S1204), and refers to the rack inventory information management table 800 and identifies the picking bay (combination of rack ID 805 and bay 806) of the conveyance rack DS where the selected article is stored (step S1205). Then, the management apparatus 302 executes a generating process (step S1206). The generating process (step S1206) is a process of generating work instruction data and route information. The generating process (step S1206) is described in detailed later.

The management apparatus 302 transmits the route information generated in the generating process (step S1206) to the conveyance vehicle AC (step S1207). As a result, when the conveyance vehicle AC receives the route information, the conveyance vehicle AC moves to the conveyance rack DS to be conveyed, lifts up the conveyance rack DS, and conveys the conveyance rack DS to a work station.

Also, the management apparatus 302 transmits the work instruction data generated in the generating process (step S1206) to the terminal Ti of the work station that is the destination of the conveyance rack DS (step S1208). Thereafter, the process returns to step S1203. In step S1203, if there are no non-selected articles remaining (step S1203: No), then the management apparatus 302 ends the work support process.

Figure 13:
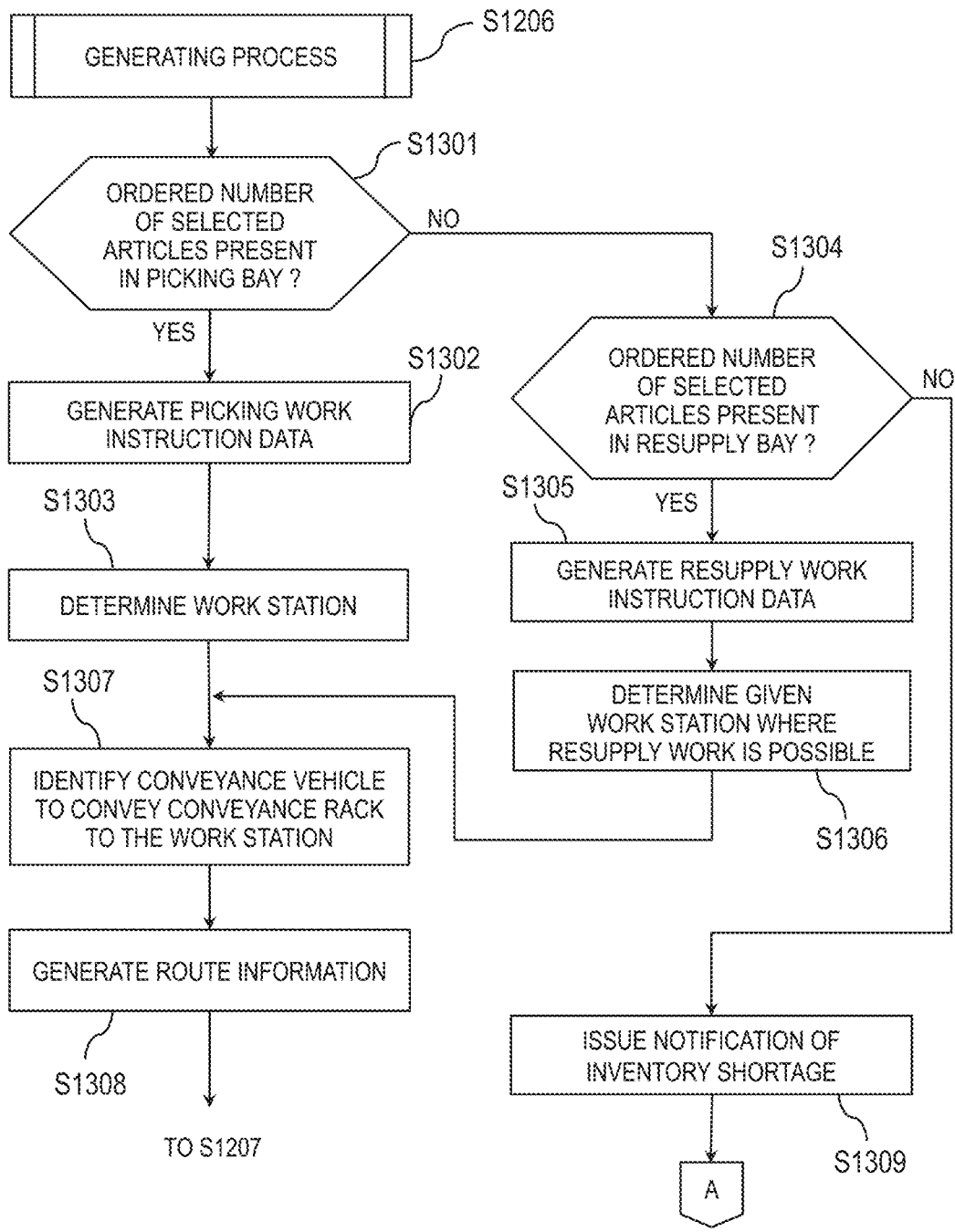
FIG. 13 is a flow chart showing an example of detailed process steps of the generating process (step S1206) shown in FIG. 12.

FIG. 13 is a flow chart showing an example of detailed process steps of the generating process (step S1206) shown in FIG. 12. In the generating process (step S1206), the management apparatus 302 determines, regarding the selected articles, whether the ordered number of articles are in inventory in the picking bay (step S1301). If the articles are in inventory (step S1301: Yes), the management apparatus 302 generates picking operation instruction data for the selected articles (step S1302). The management apparatus 302 determines a work station where the picking operation can be conducted (step S1303) and progresses to step S1307.

On the other hand, in step S1301, if the ordered number of articles are not in inventory (step S1301: No), the management apparatus 302 determines whether the ordered number of articles are in inventory in the resupply bay (step S1304). If the articles are in inventory (step S1304: Yes), the management apparatus 302 generates resupply operation instruction data for the selected articles (step S1305). Then, the management apparatus 302 determines a work station WSi where the resupply operation can be conducted (step S1306) and progresses to step S1307.

In step S1307, the management apparatus 302 identifies the conveyance vehicle AC to convey the conveyance rack DS to the determined work station WSi (step 1307). Then, the management apparatus 302 generates the route information (step S1308) and progresses to step S1207.

Also, in step S1304, regarding the selected articles, if the ordered number of articles are not in the resupply bay (step S1304: No), the management apparatus 302 notifies the WMS 301 that there is a lack of inventory for the selected article (step S1309) and progresses to step S1203. Thus, the management apparatus 302 completes the generating process (step S1206).

In this manner, according to Embodiment 1, by using the upper portion of the conveyance rack DS as the resupply bay, it is possible to improve the storage efficiency of the conveyance rack DS. By conveying the conveyance rack DS to a work station WSi that enables access to the resupply bay, the worker W can easily take out articles from the resupply bay at the upper shelf of the conveyance rack DS.

EMBODIMENT 2

Embodiment 2 will be described next. In Embodiment 1 individual articles where the form 804 is "individual" are stored in the picking bay of the conveyance rack DS, case articles where the form 804 is "case" are stored in the resupply bay of the conveyance rack DS, and the case articles in the resupply bay are used for resupply to the picking bay. Embodiment 2 is an example in which case articles are not only used for resupply but are also picked. Thus, orders in Embodiment 2 include "case" as the form 604. In Embodiment 2, differences from Embodiment 1 will be primarily described, and thus, explanations of portions in common with Embodiment 1 are omitted.

Figure 14:
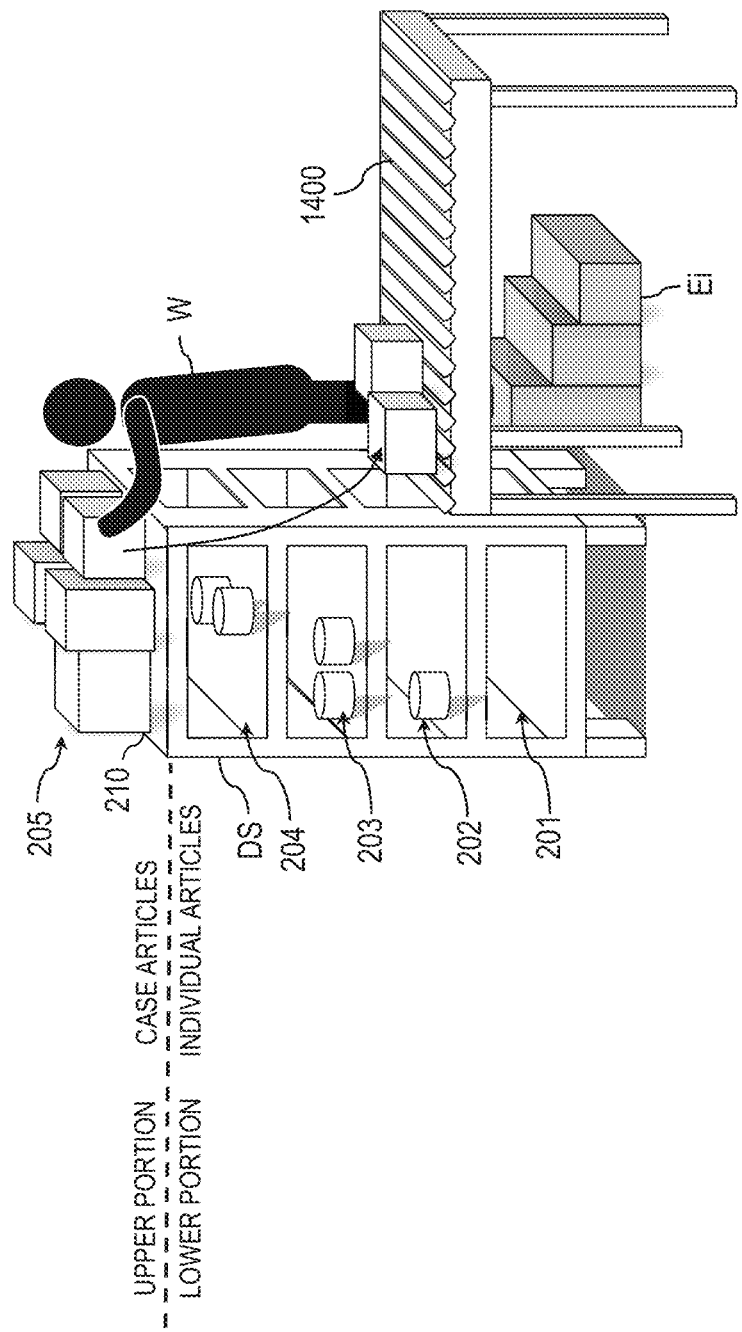
FIG. 14 is a descriptive drawing showing one example of a picking operation of Embodiment 2.

FIG. 14 is a descriptive drawing showing one example of a picking operation of Embodiment 2. In Embodiment 2, the conveyance rack DS is split into an upper portion and a lower portion, with a top surface 210 as the boundary therebetween, with case articles being stored in the upper portion and individual articles being stored in the lower portion. The upper portion of the conveyance rack DS is allocated to the picking bay and the resupply bay, and the lower portion of the conveyance rack DS is allocated to the picking bay.

Also, in Embodiment 2, some delivery orders are made in case units, among a group of orders from the WMS 301. In such a case, for orders in case units, the management apparatus 302 issues an instruction to pick articles in case units from the picking bay in the upper portion of the conveyance rack DS. On the other hand, for orders of individual articles, similar to Embodiment 1, the management apparatus 302 issues an instruction to pick individual articles from the picking bay in the lower portion of the conveyance rack DS, and if there is an inventory shortage, issues an instruction to resupply from the case articles of the same type that are stored in the resupply bay in the upper portion of the same conveyance rack DS.

Also, the work station WSi may additionally have a conveyor belt 1400 as a work support tool Ei. As a result, because the case article pulled from the upper portion of the conveyance rack DS is a group of a plurality of articles, the case article is heavier or larger in size compared to individual articles. Thus, the worker W can convey such case articles by the conveyor belt 1400.

Figure 15:
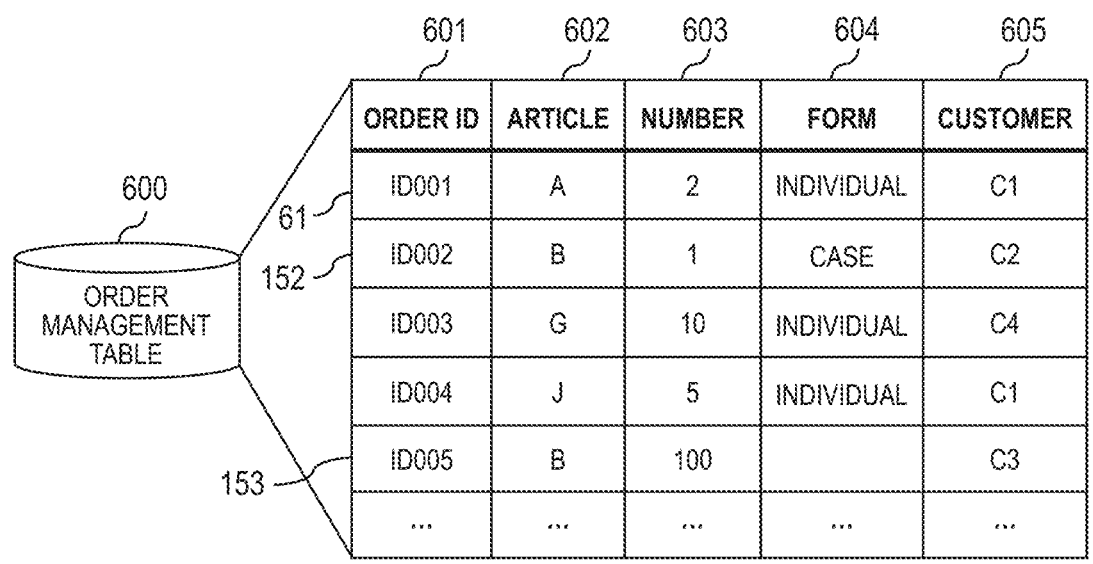
FIG. 15 is a descriptive view showing an example of an order management table of Embodiment 2.

FIG. 15 is a descriptive view showing an example of an order management table 600 of Embodiment 2. In the order management table 600 the entry 152 is an order where the form 604 is "case". For example, in the case of an article B, the form 604 of the article B in the entry 152 is "case", and the package unit 705 of the article B of FIG. 7 is "100". Thus, the article B is defined as 100 items per case. The entry 153 is an order where the form 604 is undefined.

FIG. 16 is a descriptive view showing an example of a rack inventory information management table 800 of Embodiment 2. As shown in entry 163, even if the form 804 is "case", there is rack inventory information in which the bay 806 is "upper" and the work section 807 is "picking".

<Mechanical Configuration Example>

Figure 17:
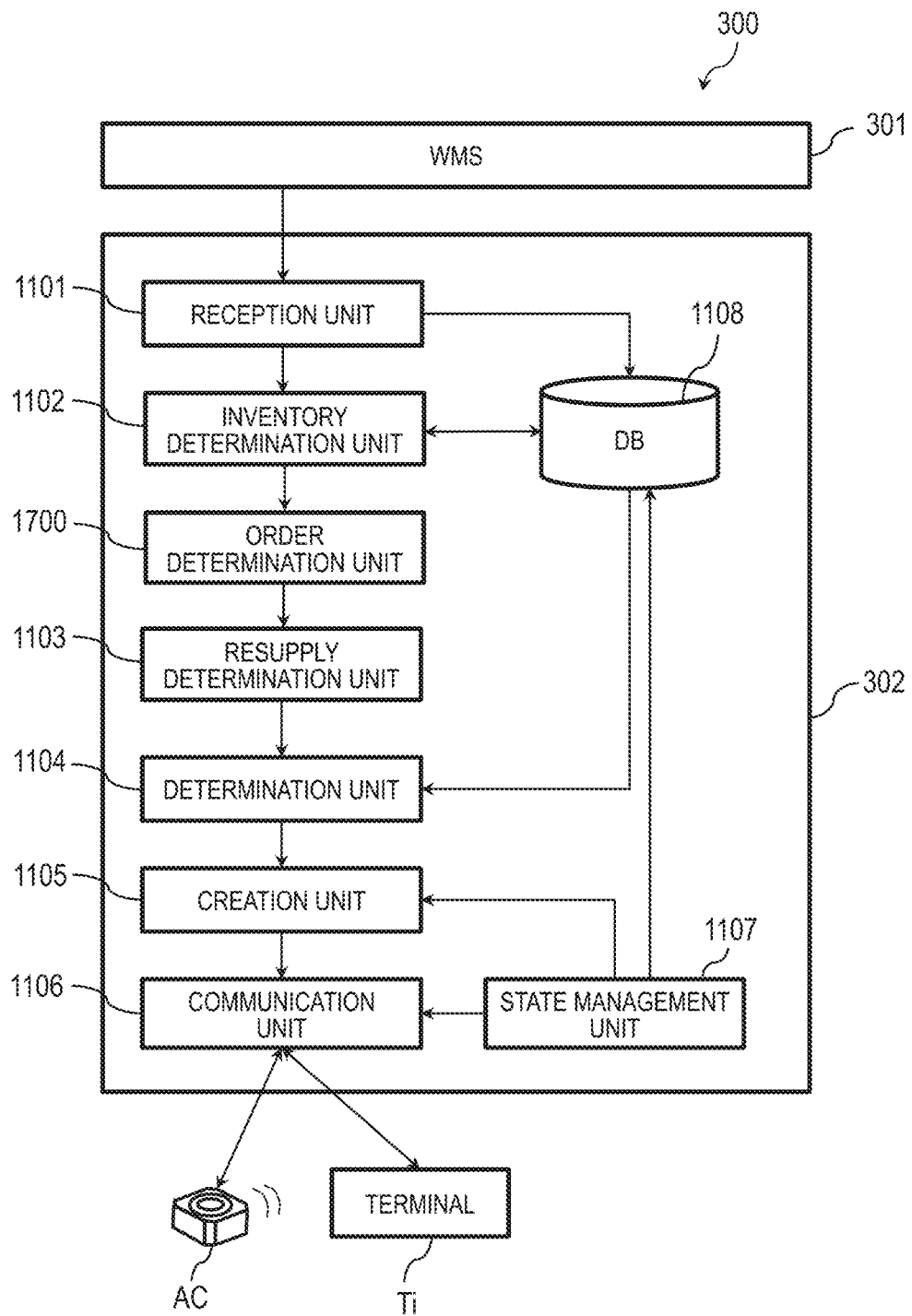
FIG. 17 is a block diagram showing a mechanical configuration example of the management apparatus according to Embodiment 2.

FIG. 17 is a block diagram showing a mechanical configuration example of the management apparatus 302 according to Embodiment 2. The management apparatus 302 of Embodiment 2 has a configuration in which an order determination unit 1700 is provided in addition to the configuration of Embodiment 1. Thus, in Embodiment 2, the explanation will be focused on the order determination unit 1700, and explanation of content that is the same as Embodiment 1 will be omitted.

The order determination unit 1700 determines the form from the order. Specifically, in the order management table 600 of FIG. 15, the form 604 of the entry 61 is "individual". Articles where the form 604 is "individual" are stored in the picking bay in the lower portion of the conveyance rack DS. The order determination unit 1700 determines that an article A that is the article 602 of the entry 61 should be picked from the picking bay in the lower portion of the conveyance rack DS.

In the work station information management table 900 of FIG. 9, none of the entries has "lower portion inaccessible" under the access 902. That is, at all work stations WSi, the lower portion of the conveyance rack DS can be accessed. Thus, the management apparatus 302 may convey the conveyance rack DS to any work station WS.

Also, in the order management table 600 of FIG. 15, the form 604 of the entry 152 is "case". In the rack inventory information management table 800 of FIG. 16, the article B with a form 604 of "case" is stored in the picking bay (bay 806, work section 807) in the upper portion of the conveyance rack DS having a rack ID 805 of "S02" in the entry 163. The order determination unit 1700 determines that the article B that is a case article stored in the picking bay in the upper portion of the conveyance rack DS should be picked.

In this case, the determination unit 1104 refers to the work station information management table 900 and determines the work station WSi where the picking operation of the article to be picked is to be performed according to the form 604 of the article to be picked, which was determined by the order determination unit 1700. If the article to be picked is an individual article, for example, the individual article is stored in the picking bay in the lower portion of the conveyance rack DS. Thus, the determination unit 1104 accesses the work station information management table 900 and determines the work station WSi where the picking operation of individual articles is to be performed from among the work stations 801 where the state 803 is "working".

If the article to be picked is a case article, the case article is stored in the resupply bay in the upper portion of the conveyance rack DS. Thus, the determination unit 1104 accesses the work station information management table 900 and determines the work station where the picking operation of the case article is to be performed from among work stations 801 where the state 803 is "working" and the access 902 is set as "upper portion accessible". The work station 801 where the access 902 is set as "upper portion accessible" is a work station WSi having the work support tool Ei.

Even if the form of the order is "case", there are instances in which the case article in the order is out of stock in the upper portion of the conveyance rack DS. In this case, the order determination unit 1700 executes a conversion process for the form 604 and the number 603. Specifically, the order determination unit 1700 converts the form of the order from "case" to "individual", and converts the number of articles in the order from the number of cases to the number of individual articles, for example.

The article 602 of the entry 152 is the article B, and the form 604 is "case", for example. If the order determination unit 1700 determines that the article B, which is a case article, is out of stock in the upper portion of the conveyance rack DS, then it determines whether individual items of the article B are stored in the lower portion of the same conveyance rack DS. If the individual items are stored, then the order determination unit 1700 converts the number of case articles of the ordered article B to the number of individual articles.

The number 603 and form 604 of the entry 62 of the order management table 600 are "1" and "case", respectively, and the article 702 and package unit 705 of the entry in the article information management table 700 with a management ID 701 of "003" are "B" and "100", respectively. Thus, when converting the number of case items of the ordered article B is converted to an individual count, there are 100 items (1×100). The order determination unit 1700 once again identifies the picking bay after conversion, and if 100 articles B are stored in the picking bay in the lower portion of the identified conveyance rack DS, the order determination unit determines that the articles B should be picked, and if there are an insufficient number of articles B, it determines that there is an inventory shortage.

In this case, the articles B are handled as individual items, and thus, the determination unit 1104 accesses the work station information management table 900 and determines the work station where the picking operation of the articles B is to be performed from among the work stations 801 where the state 803 is "working".

Also, if the form of the articles is not specified in the order, the order determination unit 1700 executes a form identification process. Specifically, for example, the order determination unit 1700 determines whether the form is "case" or "individual" on the basis of the number of ordered articles and the package unit 705 of the articles. As an example, the form 604 of the entry 153 in the order management table 600 is not specified. In other words, in the order of the entry 153, it is unclear whether 100 individual articles B are ordered, or 100 cases of articles B are ordered. Thus, the order determination unit 1700 refers to the package unit 705 of the entry 72 (article B) in the article information management table 700.

The order determination unit 1700 compares the number 603 of ordered articles 602 and 702 with the package units 705 thereof. If the number 603 is a factor of the package unit 705, then the order determination unit 1700 determines that the form 604 of the article 602 is a case. In the case of the article B, the number 603 in the entry 153 is 100, and the package unit 705 in the entry 72 is "100". Thus, the number 603 (100 items) is a factor of the package unit 705 (100) (the factor is 1, and therefore, the number is 100). Thus, the order determination unit 1700 sets the form 604 of the entry 153 to "case" and converts the number 603 from "100" to "1" (100 items÷package unit of 100).

Even if the number 603 of articles B were "200", the number is still a factor of the package unit 705. In this instance as well, the order determination unit 1700 sets the form 604 of the entry 63 to "case" and converts the number 603 from "200" to "2" (200 items÷package unit of 100).

If the number 603 is not a factor of the package unit 705, then the order determination unit 1700 determines that, among the number 603 of the articles 602, the form 604 of the maximum number of articles that is a factor of the package unit 705 is "case" and the form 604 of the remaining articles is "individual". If the number 603 of articles B is "256", for example, then the order determination unit 1700 determines that, among the "256" articles B, the form 604 of the maximum number of "200" articles, which is a factor of the package unit of "100", is determined to be "case", with the remaining "56" articles being "individual". This is the form identification process.

The management apparatus 302 manages picking operation instruction data for case articles and work instruction data for individual articles as differing picking operation instruction data. In this case, the worker W performs an operation in which, after picking, the case and individual articles that were picked are placed into the same container box, or the like.

<Example of Work Support Process Steps>

Figure 18:
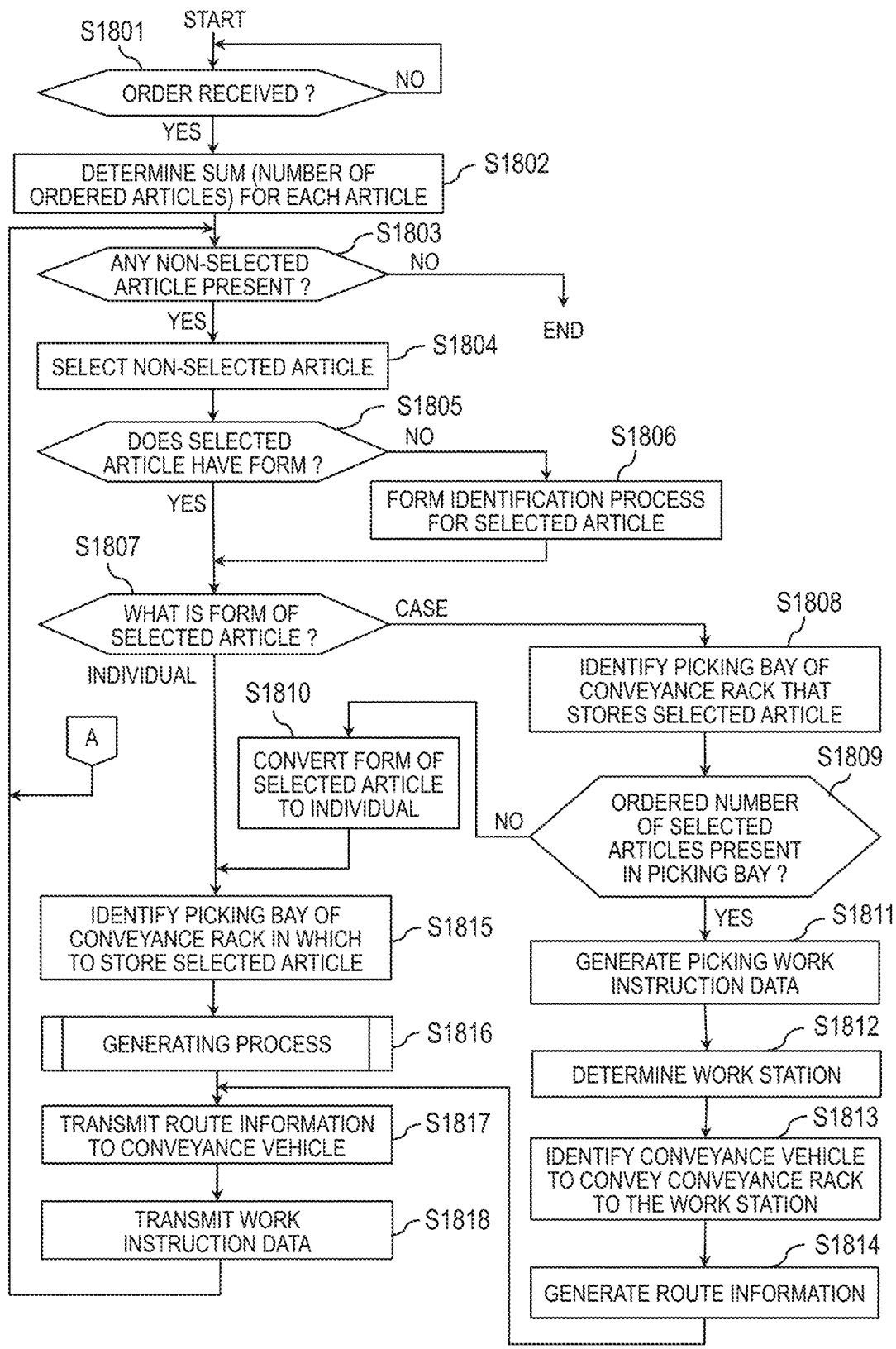
FIG. 18 is a flowchart showing an example of work support process steps by the management apparatus according to Embodiment 2.

FIG. 18 is a flowchart showing an example of work support process steps by the management apparatus 302 according to Embodiment 2. The management apparatus 302 waits for orders from the WMS 301 (step S1801: No), and when it receives an order (step S1801: Yes), the management apparatus 302 determines the total number of articles for each type of article 602 and each form 604 (step S1802). This total is referred to as the number of ordered articles. Below, articles that belong to the same type but different form 604 are handled as different articles. The management apparatus 302 determines whether there is any non-selected article from among the ordered articles (step S1803).

If there is a non-selected article (step S1803: Yes), the management apparatus 302 selects the non-selected article (step S1804) and determines whether the selected article has a form 604 (step S1805). If the article does not have a form 604 (step S1805: No), then as described above, the management apparatus 302 executes the form identification process (step S1806) and proceeds to step S1807. On the other hand, if it is determined in step S1805 that the article has a form 604 (step S1805: Yes), then the management apparatus progresses to step S1807.

Next, the management apparatus 302 determines whether the form 604 of the selected article is "individual" or "case" (step S1807). If the form is case (step S1807: case), the management apparatus 302 identifies the picking bay (combination of rack ID 805 and bay 806) of the conveyance rack DS where the selected article (case article) is stored (step S1808).

The management apparatus 302 determines, regarding the selected article (case article), whether the ordered number of articles are in inventory in the picking bay (step S1809). If the article is not in inventory (step S1809: No), the management apparatus 302 executes the above-mentioned conversion process for the form 604 and the number 603 (step S1810) of the selected article (case article) and proceeds to step S1815.

On the other hand, if the article is in inventory (step S1809: Yes), the management apparatus 302 generates picking operation instruction data for the selected article (case article) (step S1811). Then, the management apparatus 302 determines that a work station where the access 902 in the work station information management table 900 is set to "upper portion accessible" and the state 803 is set to "working", is a work station WSi where the picking operation is possible (step S1812).

Then, similar to Embodiment 1, the management apparatus 302 determines a conveyance vehicle AC to convey the conveyance rack DS to the determined work station WSi (step S1813), generates route information (step S1814), and progresses to step S1817.

On the other hand, in step S1807, if it is determined that the form 604 of the selected article is "individual" (step S1807: individual), the management apparatus 302 refers to the rack inventory information management table 800 and identifies the picking bay (combination of rack ID 805 and bay 806) of the conveyance rack DS where the selected article (individual article) is stored (step S1815). Then, the management apparatus 302 executes a generating process (step S1816). The generating process (step S1816) is the same as the generating process (step S1206) shown in FIG. 13.

Then, the management apparatus 302 transmits the generated route information to the conveyance vehicle AC (step S1817). As a result, when the conveyance vehicle AC receives the route information, the conveyance vehicle AC moves to the conveyance rack DS to be conveyed, lifts up the conveyance rack DS, and conveys the conveyance rack DS to the work station WSi.

Also, the management apparatus 302 transmits the generated work instruction data to the terminal Ti of the work station that is the destination of the conveyance rack DS (step S1818). Thereafter, the process returns to step S1803. In step S1803, if there are no non-selected articles remaining (step S1803: No), then the management apparatus 302 ends the work support process.

As described above, the shelf and bay from which to pick articles are set according to the form of the ordered article and a work station WSi where such work is possible is selected, thereby enabling a reduction in the number of resupply operations of articles from the resupply bay to the picking bay.

EMBODIMENT 3

Embodiment 3 will be described next. In Embodiments 1 and 2, examples were described in which articles for resupply are stored in the upper shelf of the conveyance rack DS. Embodiment 3 is an example in which articles for resupply are stored in the lower shelf of the conveyance rack DS. In Embodiment 3, differences from Embodiments 1 and 2 will be primarily described, and thus, explanations of portions in common with Embodiments 1 and 2 are omitted.

Figures 19, 20:
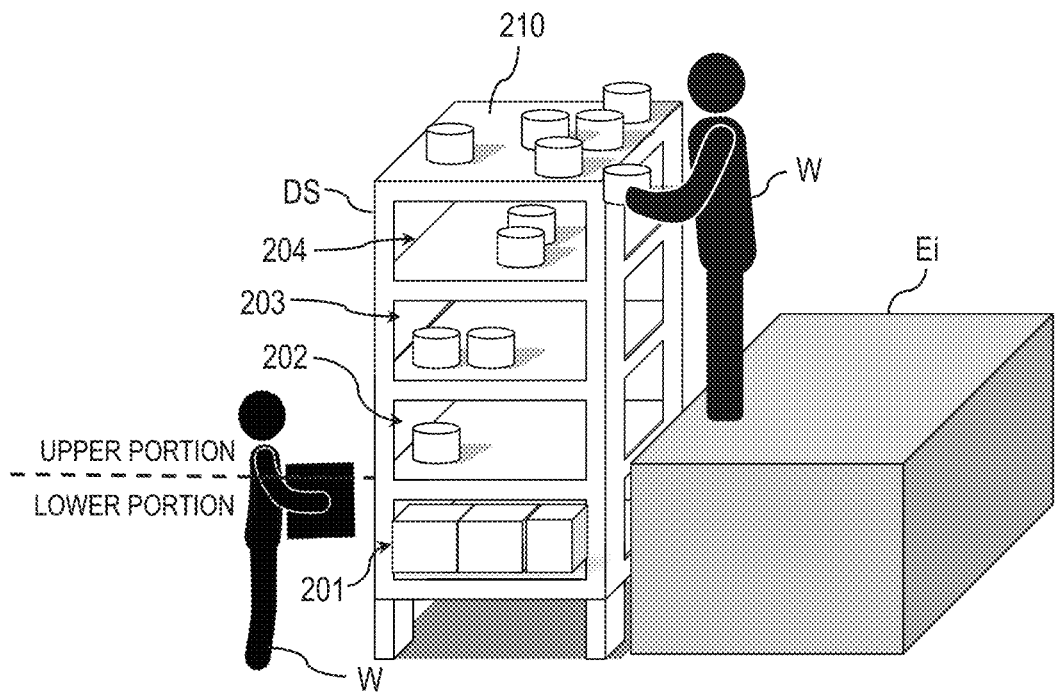
FIG. 19 is a descriptive drawing showing one example of an operation of Embodiment 3.
FIG. 20 is a descriptive view showing an example of a work station information management table of Embodiment 3.

FIG. 19 is a descriptive drawing showing one example of an operation of Embodiment 3. Here, as an example, the boundary between the upper portion and lower portion of the conveyance rack DS is the shelf board between the bottom shelf 201 and the shelf 202 that is one thereabove. If applied to Embodiment 1, the shelves 202 to 205 of the upper portion of the conveyance rack DS are the picking bay, and the lower shelf 201 is the resupply bay. The picking bay stores individual articles and the resupply bay stores case articles. If applied to Embodiment 2, the shelves 202 to 205 of the upper portion of the conveyance rack DS are the picking bay, and the lower shelf 201 is both the picking bay and the resupply bay. The picking bay in the upper shelves 202 to 205 of the conveyance rack DS stores individual articles. Also, the picking bay and resupply bay in the lower shelf 201 of the conveyance rack DS store case articles.

If applied to both Embodiments 1 and 2, for example, the worker W uses a work platform as the work support tool Ei to pick individual articles from the picking bay of the shelves 202 to 205 in the upper portion of the conveyance rack DS. Also, if there are any shortages the worker W takes individual articles from the case articles stored in the resupply bay of the bottom shelf 201 of the conveyance rack DS to resupply the picking bay of the shelves 202 to 205 in the upper portion of the conveyance rack DS. If applied to Embodiment 2, the worker W picks case articles stored in the picking bay of the bottom shelf 201 in the lower portion of the conveyance rack DS without using a work platform.

FIG. 20 is a descriptive view showing an example of a work station information management table 900 of Embodiment 3. In the work station information management table 900 shown in FIG. 7 the definitions of the access 902 were "upper portion accessible" and "upper portion inaccessible", but in the case of Embodiment 3, the definitions of the access 902 are "lower portion accessible" and "lower portion inaccessible".

Thus, in Embodiment 3, the work support tool Ei is a work platform, and the worker W can pick articles from the upper shelves 202 to 205 of the conveyance rack DS while maintaining stability at all times. In other words, the definition of access 902 can be determined according to the type of work support tool Ei. Therefore, the worker W can stably perform work regardless of the type of work support tool Ei. Also, if the picking bay of the upper shelves 202 to 205 of the conveyance rack DS is the highest frequency bay, then work efficiency can be improved.

EMBODIMENT 4

Embodiment 4 is an example in which articles that have a greater weight per package unit are stored in lower sections than lighter articles, in the configurations of Embodiments 1 to 3. That is, regardless of the form 604 of the article, the heavier articles (case articles if the form 604 is "case") are stored in the lower portion of the conveyance rack DS. If a weight threshold is determined, for example, then articles are divided into low weight articles that are under the weight threshold and heavy articles that are greater than or equal to the weight threshold. In Embodiment 4, differences from Embodiments 1 to 3 will be primarily described, and thus, explanations of portions in common with Embodiments 1 to 3 are omitted.

If applied to Embodiment 1, for example, the rack inventory information management table 800 is set such that the picking bay for individual articles greater than or equal to the weight threshold and the resupply bay for case articles that are greater than or equal to the weight threshold are in lower shelves, among the shelves 201 to 205, than bays where articles less than the weight threshold are stored.

Thus, the heavier the weight of the articles is, the lower the shelf is in which the articles are stored. Therefore, it is possible to improve the stability of the conveyance rack DS being conveyed. Also, by retaining heavier articles in the lower portions of the conveyance rack DS, it is possible to reduce the work burden on the worker W.

Also, the rack inventory information management table 800 may be set such that the picking bay for individual articles greater than or equal to the weight threshold is set at a lower position, in lower shelves 201 to 204 than the picking bay for individual articles that are less than the weight threshold. Additionally, the rack inventory information management table 800 may be set such that the resupply bay for case articles greater than or equal to the weight threshold is set at a lower position than the resupply bay for case articles that are less than the weight threshold, in the upper shelf 205.

As a result, heavier individual articles are stored in a picking bay at lower portions of the lower shelves of the conveyance rack DS, and heavier case articles are stored in resupply bays at lower portions of the upper shelves of the conveyance rack DS. Therefore, it is possible to improve the stability of the conveyance rack DS being conveyed. Also, by retaining heavier articles in the lower portions of the conveyance rack DS, it is possible to reduce the work burden on the worker W. Additionally, the picking bay is set at lower shelves than the resupply bay, and thus, picking operation efficiency can be maintained.

If applied to Embodiment 2, for example, the rack inventory information management table 800 is set such that the picking bay for individual articles greater than or equal to the weight threshold, the resupply bay for case articles greater than or equal to the weight threshold, and the picking bay for case articles that are greater than or equal to the weight threshold are in lower shelves, among the shelves 201 to 205, than bays where articles less than the weight threshold are stored.

Thus, the heavier the weight of the articles is, the lower the shelf is in which the articles are stored. Therefore, it is possible to improve the stability of the conveyance rack DS being conveyed. Also, by retaining heavier articles in the lower portions of the conveyance rack DS, it is possible to reduce the work burden on the worker W.

Also, when applied to Embodiment 2, for example, the rack inventory information management table 800 may be set such that the picking bay for individual articles greater than or equal to the weight threshold is set at a lower position, in lower shelves 201 to 204, than the picking bay for individual articles that are less than the weight threshold. Additionally, the rack inventory information management table 800 may be set such that the picking bay and the resupply bay for case articles greater than or equal to the weight threshold are set at a lower position than the picking bay and resupply bay for case articles that are less than the weight threshold in the upper shelf 205.

As a result, heavier individual articles are stored in a picking bay at lower portions of the lower shelves of the conveyance rack DS, and heavier case articles are stored in resupply bays at lower portions of the upper shelves of the conveyance rack DS. Therefore, it is possible to improve the stability of the conveyance rack DS being conveyed. Also, by retaining heavier articles in the lower portions of the conveyance rack DS, it is possible to reduce the work burden on the worker W. Additionally, the picking bay for individual articles is set at lower shelves than the resupply bay for case articles, and thus, picking operation efficiency can be maintained. The upper shelves also have picking bays for case articles, and thus, it is possible to reduce the resupply operation from the resupply bay to the picking bay.

If applied to Embodiment 3, for example, the rack inventory information management table 800 is set such that the picking bay for individual articles greater than or equal to the weight threshold, the resupply bay for case articles greater than or equal to the weight threshold, and the picking bay for case articles that are greater than or equal to the weight threshold are in lower shelves, among the shelves 201 to 205, than bays where articles less than the weight threshold are stored.

Thus, the heavier the weight of the articles is, the lower the shelf is in which the articles are stored. Therefore, it is possible to improve the stability of the conveyance rack DS being conveyed. Also, by retaining heavier articles in the lower portions of the conveyance rack DS, it is possible to reduce the work burden on the worker W.

Also, when applied to Embodiment 3, for example, the rack inventory information management table 800 may be set such that the picking bay for individual articles greater than or equal to the weight threshold is set at a lower position, in upper shelves 202 to 205, than the picking bay for individual articles that are less than the weight threshold. Additionally, the rack inventory information management table 800 may be set such that the picking bay and the resupply bay for case articles greater than or equal to the weight threshold are set at a lower position than the picking bay and resupply bay for case articles that are less than the weight threshold in the lower shelf 201.

Also, when applied to Embodiment 3, for example, the rack inventory information management table 800 may be set such that the picking bay for individual articles greater than or equal to the weight threshold is set at a lower position, in upper shelves 202 to 205, than the picking bay for individual articles that are less than the weight threshold. Additionally, the rack inventory information management table 800 may be set such that the picking bay and the resupply bay for case articles greater than or equal to the weight threshold are set at a lower position than the picking bay and resupply bay for case articles that are less than the weight threshold in the lower shelf 201.

As a result, heavier individual articles are stored in a picking bay at lower portions of the lower shelves of the conveyance rack DS, and heavier case articles are stored in resupply bays at lower portions of the upper shelves of the conveyance rack DS. Therefore, it is possible to improve the stability of the conveyance rack DS being conveyed. Also, by retaining heavier articles in the lower portions of the conveyance rack DS, it is possible to reduce the work burden on the worker W. Additionally, the picking bay for individual articles is set at upper shelves than the resupply bay for case articles, and thus, in the case of conveyance racks DS where the upper shelves are accessible without a work support tool Ei, picking operation efficiency can be maintained. The upper shelves also have picking bays for case articles, and thus, it is possible to reduce the resupply operation from the resupply bay to the picking bay.

EMBODIMENT 5

Embodiment 5 is an example in which articles are conveyed to the upper portion of the conveyance racks DS, in the configuration of Embodiments 1 to 4. In Embodiment 5, differences from Embodiments 1 to 4 will be primarily described, and thus, explanations of portions in common with Embodiments 1 to 4 are omitted.

Figure 21:
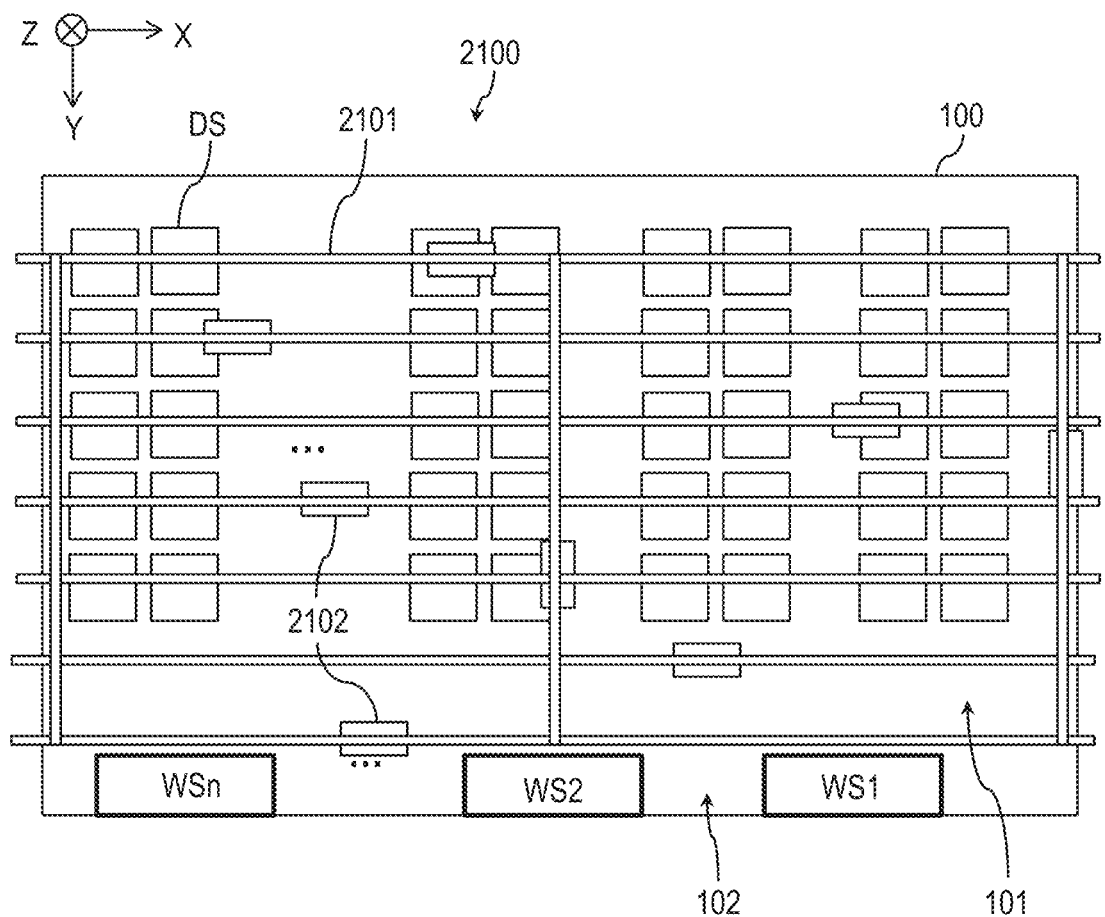
FIG. 21 is a plan view showing an example of a conveyance system.
Figure 22:
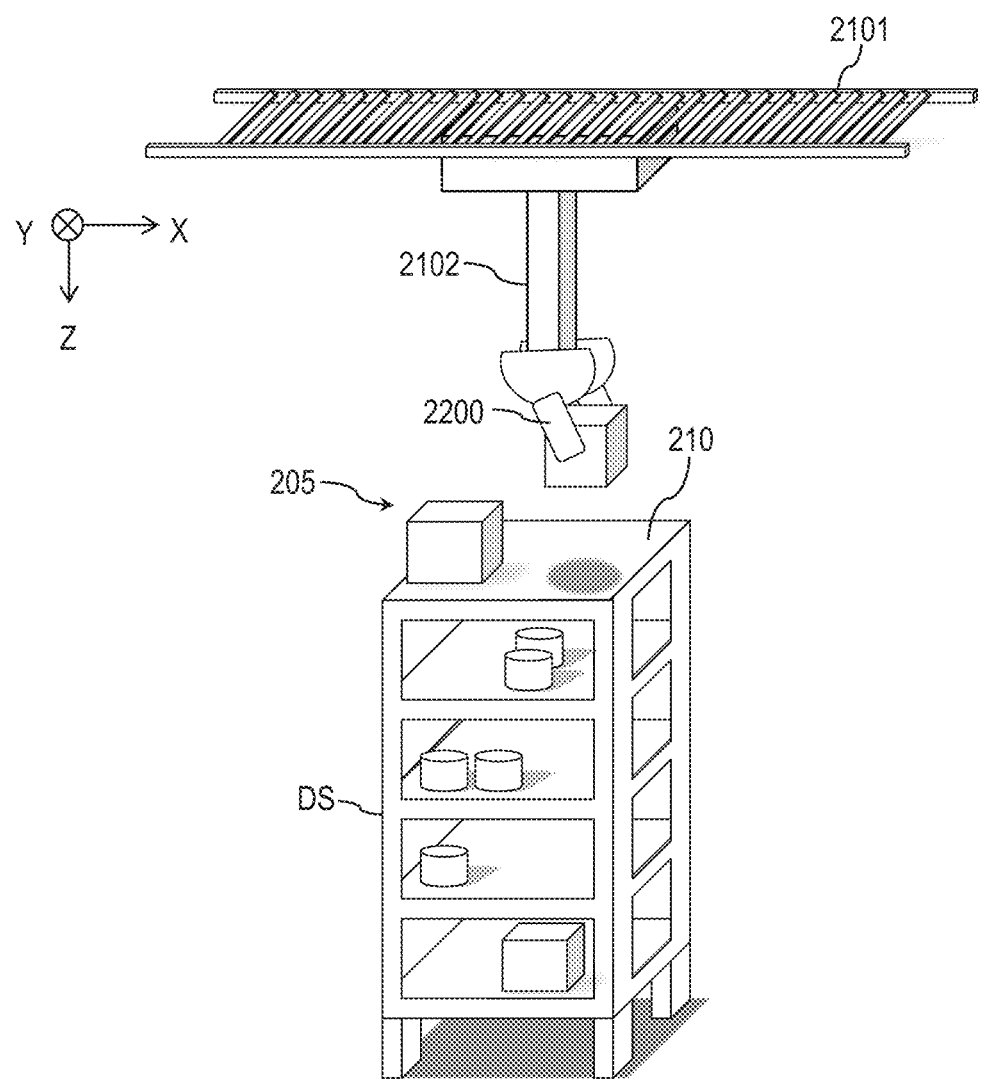
FIG. 22 is a descriptive view showing a conveyance example for articles by the conveyance system.

FIG. 21 is a plan view showing an example of a conveyance system. FIG. 22 is a descriptive view showing a conveyance example for articles by the conveyance system. A conveyance system 2100 is disposed on the ceiling of a warehouse 100. The conveyance system 2100 has a rail 2101 and a conveyance device 2102. The rail 2101 moves the conveyance device 2102 in the X direction and the Y direction. The X direction and the Y direction are directions that are perpendicular to each other, and an XY plane formed along the X direction and the Y direction is a plane parallel to the floor surface of the storage area 101.

The conveyance device 2102 is controlled by the management apparatus 302. Specifically, the conveyance device 2102 moves along the rail 2101, for example. The conveyance device 2102 is raised and lowered along the Z direction on the rail 2101. The Z direction is a direction perpendicular to the XY plane. The conveyance device 2102 has an arm 2200 and holds and releases articles. The conveyance device 2102 holds, using the arm 2200, an article delivered to the work station WSi or an article stored on the shelf 205 having a top surface 210 of the conveyance rack DS, moves the article to the location of the destination conveyance rack DS using the rail 2101, and places the article on the top surface 210 of the conveyance rack DS.

Figure 23:
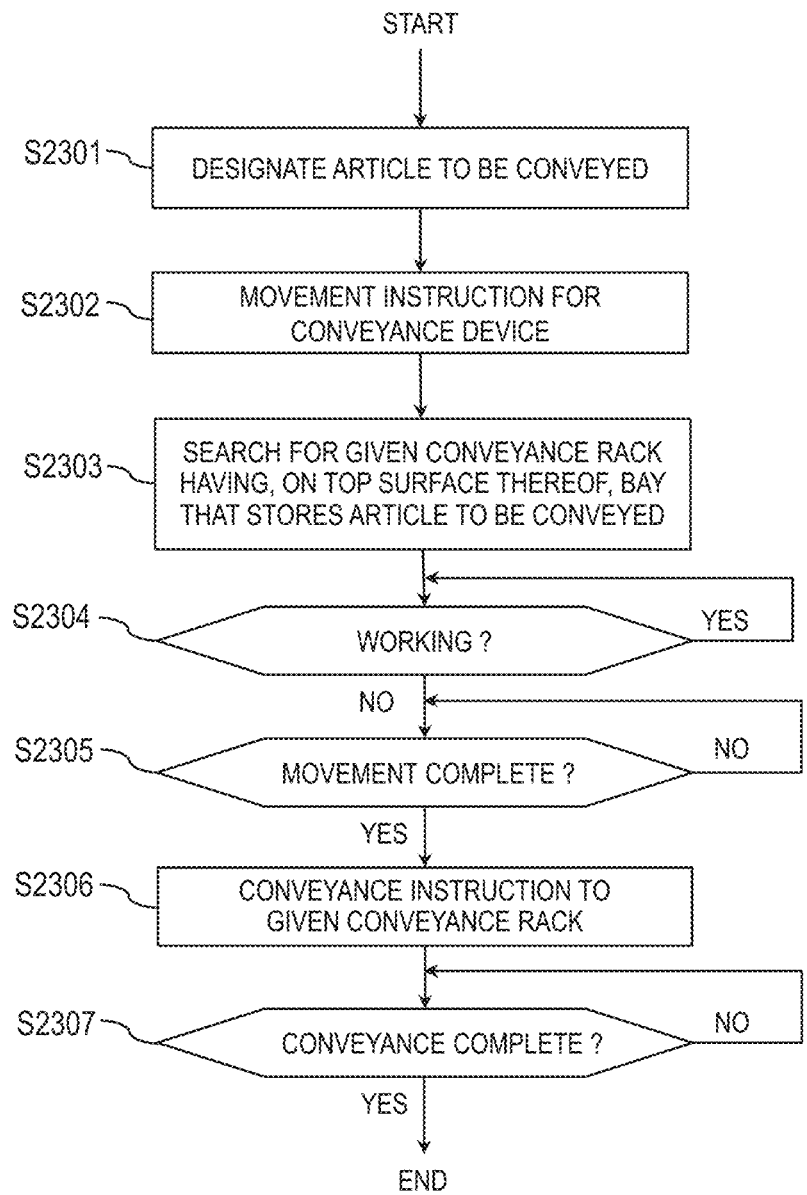
FIG. 23 is a flowchart showing an example of article conveyance process steps.

FIG. 23 is a flowchart showing an example of article conveyance process steps. The management apparatus 302 designates an article to be conveyed by an operation input by a manager (step S2301). The article to be conveyed may be an article delivered to the work station, or may be an article stored on the shelf 205 having the top surface 210 of the conveyance rack DS, for example. The management apparatus 302 transmits, to the conveyance device 2102, a movement instruction for movement to the designated article to be conveyed (step S2302). The management apparatus 302 transmits a movement instruction for movement to the designated article to be conveyed, to the closest conveyance device 2102, for example. As a result, the conveyance device 2102 moves to the location of the article to be conveyed, lowers its arm 2200, grabs the article to be conveyed, and then raises the arm 2200. The conveyance device 2102 then transmits a movement completion notification to the management apparatus 302.

The management apparatus 302 refers to the rack inventory information management table 800 and searches for a specific conveyance rack DS having a shelf 205 including a bay that stores the article to be conveyed (step S2303). Then, the management apparatus 302 determines whether work is being performed on the specific conveyance rack DS found during the search (step S2304). Specifically, for example, the management apparatus 302 identifies conveyance vehicles AC in which the conveyance operation flag is ON, and determines whether the rack ID of the specific conveyance rack DS found in step S2303 is included in the conveyance information of the conveyance vehicles AC. If the rack ID of the specific conveyance rack DS is included (step S2304: Yes), then it is determined that work is being performed on the specific conveyance rack DS, and the management apparatus 302 stands by until the conveyance operation flag is OFF. On the other hand, if it is determined that the rack ID of the specific conveyance rack DS is not included (step S2304: No), then the process progresses to step S2305.

The management apparatus 302 determines whether movement has been completed, that is, whether the conveyance device 2102 has moved to above the article to be conveyed (step S2305). Specifically, the management apparatus 302 determines that movement is completed when it receives a movement completion notification from the conveyance device 2102, for example. If movement has not been completed (step S2305: No), the management apparatus 302 stands by until movement is completed. If movement is completed (step S2305: Yes), the management apparatus 302 transmits to the designated conveyance device 2102 a conveyance command to convey the specific conveyance rack DS. As a result, the conveyance device 2102 moves to the location of the specific conveyance rack DS, lowers its arm 2200, places the article to be conveyed on the bay of the shelf 205 of the specific conveyance rack DS, and then raises the arm 2200. The conveyance device 2102 then transmits a conveyance completion notification to the management apparatus 302.

The management apparatus 302 determines whether conveyance has been completed, that is, whether the conveyance device 2102 has placed the article to be conveyed on the specific conveyance rack DS (step S2307). Specifically, the management apparatus 302 determines that conveyance is completed when it receives a conveyance completion notification from the conveyance device 2102, for example. If conveyance has not been completed (step S2307: No), the management apparatus 302 stands by until conveyance is completed. If conveyance is completed (step S2307: Yes), the management apparatus 302 ends the article conveyance process.

As a result, it is possible to automatically resupply the shelf 205 in the upper portion of the conveyance rack DS and increase the efficiency of the resupply operation.

In the above example, the conveyance device 2102 was moved to above the conveyance rack DS, thereby storing an article held by the conveyance device 2102 in the conveyance rack DS, but a configuration may be adopted in which a conveyance rack DS to store an article being held by the conveyance device 2102 is moved to below the conveyance device 2102. In this case, as indicated in step S2303, the management apparatus 302 refers to the rack inventory information management table 800 and searches for a specific conveyance rack DS having a shelf 205 including a bay that stores the article to be conveyed, and a specific conveyance vehicle AC that is closest to the specific conveyance device DS.

The management apparatus 302 generates route information indicating movement from the location of a specific conveyance vehicle AC and arriving to below the conveyance device 2102 by way of the specific conveyance rack DS, and transmits conveyance instruction data including the generated route information to the conveyance vehicle AC. The specific conveyance vehicle AC conveys in a lifted up state the specific conveyance rack DS according to the received route information and arrives to below the location of the conveyance device 2102. When it arrives, the conveyance vehicle AC transmits an arrival notification to the management apparatus 302. When the management apparatus 302 receives the arrival notification, it controls the conveyance device 2102 and places the article on the topmost shelf of the specific conveyance rack DS that has arrived therebelow. Then, the management apparatus 302 transmits return instruction data to the specific conveyance vehicle AC, and upon receipt of the return instruction data, the specific conveyance vehicle AC returns the specific conveyance rack DS to the original location thereof according to the route information.

As a result, the conveyance system does not need to move the conveyance device 2102 in a precise manner directly above the conveyance rack DS, allowing for a simplified conveyance system and a reduction in equipment costs.

As described above, according to the present embodiment, it is possible to increase the efficiency of the resupply operation from the resupply bay, which is the first storage position, to the picking bay, which is the second storage position.

Also, by arranging the first storage position to above the second storage position, it is possible to restock the lower storage position with articles stored in the upper storage position. In other words, it is possible to set the upper storage position as the resupply bay, and make efficient use of the storage space. Also, the lower storage position is resupplied with articles from the upper storage position, and thus, it is possible to increase the efficiency of the picking operation from the lower storage position.

Alternatively, the first storage position may be set below the second storage position. By this configuration, it is possible to restock the upper storage position with articles stored in the lower storage position. In other words, it is possible to set the lower storage position as the resupply bay, and make efficient use of the storage space. Also, the upper storage position is resupplied with articles from the lower storage position, and thus, it is possible to increase the efficiency of the picking operation from the upper storage position.

Also, the storage position for articles can be set as the first storage position or the second storage position depending on the form of the article. As a result, the combination of the first storage position and the second storage position is set to be suitable for a resupply operation that takes into consideration the form of the article, and thus, it is possible to increase the efficiency of the resupply operation.

Also, the storage position of the article may be set according to the weight of the article such that the storage position for heavier articles is at a lower portion of the conveyance rack. As a result, it is possible to improve the stability of the conveyance rack being conveyed. Also, it is possible to reduce the work burden on the worker W.

Additionally, a conveyance system including a conveyance device that conveys articles may be used. As a result, it is possible to easily store articles in upper portions of the conveyance rack, and to make efficient use of the storage space.

The movement device may be used to convey the conveyance rack to above the conveyance device. As a result, there is no need to move the conveyance device 2102 in a precise manner directly above the conveyance rack DS, allowing for a simplified conveyance system and a reduction in equipment costs.

The storage position may be searched according to the form of the article included in the order. As a result, it is possible to issue an instruction for a resupply operation or a picking operation according to the form of the article and increase work efficiency.

The storage position may be searched according to the number of articles included in the order, and the bay that satisfies the number of articles may be specified. As a result, it is possible to automatically determine whether to perform a resupply operation or a picking operation, thereby increasing work efficiency.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A picking system for replenishing articles from picking bays on a moveable conveyance rack with articles from resupply bays on a same rack,
    wherein the picking system comprises:
    a processor that executes a program;
    a storage device that stores the program; and
    a communication interface that communicates with a movement device that moves the moveable conveyance rack that stores an article and a terminal of a work station at which work is to be performed on the moveable conveyance rack,
    wherein the storage device has rack inventory information about the article in the moveable conveyance rack and the work section pertaining to the storage position of the article, and work station information including information indicating whether a first storage position of the moveable conveyance rack is accessible at the work station, and
    wherein the processor
        receives an order indicating a specific article,
        searches, from the rack inventory information, the first storage position where the specific article is stored,
        generates work instruction data pertaining to a specific work section for instructing movement of the specific article from the first storage position to a second storage position of the moveable conveyance rack,
        searches for a specific work station where work in the specific work section can be performed by accessing the first storage position, with reference to the work station information,
        transmits the work instruction data to the terminal of the specific work station, and
        transmits, to the movement device, conveyance instruction data for instructing the conveyance of the moveable conveyance rack to the specific work station.

2. The picking system according to claim 1,
    wherein the first storage position is a storage position above the second storage position.

3. The picking system according to claim 1,
    wherein the first storage position is a storage position below the second storage position.

4. The picking system according to claim 1,
    wherein the rack inventory information includes an article form defining a package unit of the article according to the storage position, and
    wherein the storage position for the article is set as the first storage position or the second storage position depending on the article form.

5. The picking system according to claim 1,
    wherein the storage position of the article is set according to a weight of the article such that the storage position for a heavier article is at a lower portion of the moveable conveyance rack.

6. The picking system according to claim 1, further comprising:
    a conveyance system including a conveyance device that conveys the article, the conveyance device being located above a storage area where the moveable conveyance rack is located, wherein the processor
  searches the rack inventory information for a conveyance rack that is a storage destination for an article to be stored in the first storage position,
  controls the conveyance device and conveys the article to be stored, and,
  if the conveyance device is located above the conveyance rack that is the storage destination for the article to be stored, stores the article to be stored in the first storage position in the conveyance rack that is the storage destination.

7. The picking system according to claim 6,
wherein the processor
  transmits, to the movement device, specific conveyance instruction data instructing conveyance of the article to be stored to a position below the conveyance device holding the article to be stored, and,
  if the conveyance rack that is the storage destination arrives to below the conveyance device as a result of being moved by the movement device, controls the conveyance device such that the article to be stored is stored in the first storage position in the conveyance rack that is the storage destination.

8. The picking system according to claim 1,
wherein the rack inventory information includes an article form defining a package unit of the article according to the storage position, and
wherein the order includes a specific article form pertaining to a specific article, and
wherein the processor
  searches the rack inventory information for a specific storage position associated with the specific article form, from among the first storage position and the second storage position, and
  generates work instruction data, pertaining to the work section corresponding to the specific storage position, for extracting the specific article from the specific storage position.

9. The picking system according to claim 1,
wherein the order further includes a number of said specific articles, and
wherein the processor
  searches the rack inventory information for a specific storage position that satisfies the number of said specific articles, from among the first storage position and the second storage position, and
  generates work instruction data, pertaining to the work section corresponding to the specific storage position, for extracting the specific article from the specific storage position.

10. A picking system for replenishing articles from picking bays on a moveable conveyance rack with articles from resupply bays on a same rack,
  wherein the picking system comprises:
  a processor that executes a program;
  a storage device that stores the program;
  a communication interface that communicates with a movement device that moves the moveable conveyance rack that stores an article and a terminal of a work station at which the work support is to be performed on the moveable conveyance rack; and
  a conveyance system including a conveyance device that conveys the article, the conveyance device being located above a storage area where the moveable conveyance rack is located, wherein the storage device has rack inventory information about the article in the moveable conveyance rack and the work section pertaining to the storage position of the article, and
wherein the processor
  searches the rack inventory information for a conveyance rack that is a storage destination to store an article to be stored,
  controls the conveyance device and conveys the article to be stored to above the conveyance rack that is the storage destination for the article to be stored, and
  stores the article to be stored in an upper storage position of the conveyance rack that is the storage destination.

11. A picking method by a picking system for replenishing articles from picking bays on a moveable conveyance rack with articles from resupply bays on a same rack,
  wherein the picking system has a processor that executes a program, a storage device that stores the program, and a communication interface that communicates with a movement device that moves the moveable conveyance rack that stores an article and a terminal of a work station at which work is to be performed on the moveable conveyance rack,
  wherein the storage device has rack inventory information about the article in the moveable conveyance rack and the work section pertaining to the storage position of the article, and work station information including information indicating whether a first storage position of the moveable conveyance rack is accessible at the work station, and
  wherein, in the picking method,
  the processor
    receives an order indicating a specific article,
    searches, from the rack inventory information, the first storage position where the specific article is stored,
    generates work instruction data pertaining to a specific work section for instructing movement of the specific article from the first storage position to a second storage position of the moveable conveyance rack,
    searches for a specific work station where work in the specific work section can be performed by accessing the first storage position, with reference to the work station information,
    transmits the work instruction data to the terminal of the specific work station, and
    transmits, to the movement device, conveyance instruction data for instructing the conveyance of the moveable conveyance rack to the specific work station.

12. The picking method according to claim 11,
wherein the first storage position is a storage position above the second storage position.

13. The picking method according to claim 11,
wherein the first storage position is a storage position below the second storage position.

14. The picking method according to claim 11,
wherein the first storage position and the second storage position are each set according to a form of the article being stored in each storage position.

15. The picking method according to claim 11,
wherein the storage position of the article is set according to a weight of the article such that the storage position for a heavier article is at a lower portion of the moveable conveyance rack.

\* \* \* \* \*